(12) United States Patent
Starner et al.

(10) Patent No.: US 9,383,919 B2
(45) Date of Patent: Jul. 5, 2016

(54) TOUCH-BASED TEXT ENTRY USING HIDDEN MARKOV MODELING

(71) Applicants: Thad Eugene Starner, Mountain View, CA (US); Nirmal Patel, Mountain View, CA (US); Shumin Zhai, Mountain View, CA (US)

(72) Inventors: Thad Eugene Starner, Mountain View, CA (US); Nirmal Patel, Mountain View, CA (US); Shumin Zhai, Mountain View, CA (US)

(73) Assignee: Google Inc., Mountain View, CA (US)

( * ) Notice: Subject to any disclaimer, the term of this patent is extended or adjusted under 35 U.S.C. 154(b) by 661 days.

(21) Appl. No.: 13/632,042

(22) Filed: Sep. 30, 2012

(65) Prior Publication Data

US 2015/0177981 A1     Jun. 25, 2015

Related U.S. Application Data

(60) Provisional application No. 61/584,213, filed on Jan. 6, 2012.

(51) Int. Cl.
*G06F 3/0488*     (2013.01)
(52) U.S. Cl.
CPC ........ *G06F 3/04886* (2013.01); *G06F 3/04883* (2013.01)

(58) Field of Classification Search
CPC .................................. G06F 3/041; G08B 21/00
USPC ............................................ 345/173; 340/540
See application file for complete search history.

(56) References Cited

U.S. PATENT DOCUMENTS

| 7,042,442 | B1 | 5/2006 | Kanevsky et al. |
| 7,382,358 | B2 | 6/2008 | Kushler et al. |
| 2006/0262115 | A1* | 11/2006 | Shapiro .................. G06N 7/005 345/419 |
| 2007/0040813 | A1* | 2/2007 | Kushler et al. ................ 345/173 |
| 2011/0210850 | A1* | 9/2011 | Tran .................... G06F 3/04883 340/540 |
| 2011/0254765 | A1* | 10/2011 | Brand ..................... G06F 3/017 345/158 |

* cited by examiner

*Primary Examiner* — Nicholas Lee
*Assistant Examiner* — Sepideh Ghafari
(74) *Attorney, Agent, or Firm* — McDonnell Boehnen Hulbert & Berghoff LLP

(57) ABSTRACT

Described techniques enable a computing system to receive character string input (e.g., words, numbers, mathematical expressions, symbolic strings, etc.) by detecting and interpreting an input movement across a user-interface. A touch-based computing system may, for instance, detect an input movement by tracking the path of a pointing element (e.g., a stylus or finger) as it is dragged across a contact-sensitive input surface (e.g., a touch-sensitive screen or external touch pad). Then, the system may interpret the detected input movement using Hidden Markov Modeling.

46 Claims, 15 Drawing Sheets

TOUCH-BASED TEXT ENTRY USING HIDDEN MARKOV MODELING

RELATED APPLICATIONS

This application claims priority to U.S. Provisional Patent Application Ser. No. 61/584,213, entitled Touch-Based Text Entry Using Hidden Markov Modeling, filed Jan. 6, 2012, which is incorporated by reference.

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, among many other types of computing systems, are increasingly prevalent in numerous aspects of modern life. As computers become progressively more integrated with users' everyday life, the convenience, efficiency, and intuitiveness of the user-interfaces by which users interact with computing devices becomes progressively more important.

A user-interface may include various combinations of hardware and software which enable the user to, among other things, interact with a computing system. One example of a modern user-interface is a "pointing device" that may allow a user to input spatial data into a computing system. The spatial data may be received and processed by the computing system, and may ultimately be used by the computing system as a basis for executing certain computing functions.

One type of pointing device may, generally, be based on a user moving an object. Examples of common such pointing devices include a computer mouse, a trackball, a joystick, a pointing stick, and a roller mouse. Other examples of pointing devices based on a user moving an object may exist as well. In typical arrangements, the object includes sensors that are arranged to transmit, to the computing system, data that indicates the distance and direction of movement of the object. The computing system may be equipped with a graphical display that may, for example, provide a visual depiction of a graphical pointer that moves in accordance with the movement of the object. The graphical display may also provide a visual depiction of other objects that the user may manipulate, including, for example, a visual depiction of a graphical user-interface. The user may refer to such a graphical user-interface when inputting data.

Another type of pointing device may, generally, be based on a user touching a surface. Examples of common such pointing devices include a touchpad and a touch screen. Other examples of pointing devices based on a user touching a surface may exist as well. In typical arrangements, the surface is a flat surface that can detect contact with the user's finger (and/or another pointing tool such as a stylus). For example, the surface may include electrode sensors that are arranged to transmit, to the computing system, data that indicates the distance and direction of movement of the finger on the surface. The computing system may be equipped with a graphical display similar to the graphical display described above. Implementations of a touchpad typically involve a graphical display that is physically remote from the touchpad. However, a touchscreen is typically characterized by a touchpad embedded into a graphical display such that users may interact directly with a visual depiction of the graphical user-interface, and/or other elements displayed on the graphical display, by touching the graphical display itself.

User-interfaces may be arranged to provide various combinations of keys, buttons, and/or, more generally, input regions. Often, user-interfaces will include input regions that are associated with multiple characters and/or computing commands. Typically, users may select various characters and/or various computing commands, by performing various input actions on the user-interface.

As computing devices continue to become smaller and more portable, however, input systems must likewise become smaller. Such smaller input systems can impair the accuracy of user-input. For example, if an input system that is controlled by a user's finger includes input buttons that are around the size of, or even smaller than, the user's fingertip, it may become difficult for the user to interact with the input system and therefore the overall accuracy and/or efficiency of the system may suffer. Further, as input systems become smaller, the speed with which a user may use the system may suffer. An improvement is therefore desired.

SUMMARY

The disclosure herein may help to facilitate more accurate, more efficient, and/or faster use of an input system of a computing device. More particularly, the disclosure herein relates to techniques for touch-based text entry that involve Hidden Markov Modeling (HMM).

In one aspect, a system is provided. The system may include: (1) a processor; (2) a non-transitory computer readable medium; and (3) program instructions stored on the non-transitory computer readable medium and executable by the processor to cause a computing device to: (a) provide a user-interface including a set of input regions, where each of the input regions is associated with at least one character from a set of characters; (b) receive data indicating an input movement corresponding at least to (i) at least two intended input states, where each of the at least two intended input states is associated with at least one input region, and (ii) a transition between the at least two intended input states; (c) determine, for each of one or more possibly-intended inputs, a respective likelihood that each respective possibly-intended input corresponds to the input movement, where each of the one or more possibly-intended inputs is associated with (i) at least two possible input states, where each of the at least two possible input states is associated with at least one input region and (ii) a possible transition between the at least two possible input states, and where each respective likelihood is determined based at least in part on (i) a likelihood that the at least two intended input states correspond to the at least two possible input states associated with the respective possibly-intended input, and (ii) a likelihood that the transition between the at least two intended input states corresponds to the possible transition between the at least two possible input states; (d) select, based on at least one determined respective likelihood, at least one possibly-intended input; and (e) cause a visual display of the selected at least one possibly-intended input.

In another aspect, a non-transitory computer-readable medium is provided. The non-transitory computer-readable medium may include instructions including: (a) providing a user-interface including a set of input regions, where each of the input regions is associated with at least one character from a set of characters; (b) receiving data indicating an input movement corresponding at least to (i) at least two intended input states, where each of the at least two intended input states is associated with at least one input region, and (ii) a transition between the at least two intended input states; (c) determining, for each of one or more possibly-intended inputs, a respective likelihood that each respective possibly-intended input corresponds to the input movement, where each of the one or more possibly-intended inputs is associated with (i) at least two possible input states, where each of the at least two possible input states is associated with at least one input region and (ii) a possible transition between the at least two possible input states, and where each respective likelihood is determined based at least in part on (i) a likelihood that the at least two intended input states correspond to the at least two possible input states associated with the respective possibly-intended input, and (ii) a likelihood that the transition between the at least two intended input states corresponds to the possible transition between the at least two possible input states; (d) selecting, based on at least one determined respective likelihood, at least one possibly-intended input; and (e) causing a visual display of the selected at least one possibly-intended input.

In yet another aspect, a method is provided. The method may involve: (a) providing a user-interface including a set of input regions, where each of the input regions is associated with at least one character from a set of characters; (b) receiving data indicating an input movement corresponding at least to (i) at least two intended input states, where each of the at least two intended input states is associated with at least one input region, and (ii) a transition between the at least two intended input states; (c) determining, for each of one or more possibly-intended inputs, a respective likelihood that each respective possibly-intended input corresponds to the input movement, where each of the one or more possibly-intended inputs is associated with (i) at least two possible input states, where each of the at least two possible input states is associated with at least one input region and (ii) a possible transition between the at least two possible input states, and where each respective likelihood is determined based at least in part on (i) a likelihood that the at least two intended input states correspond to the at least two possible input states associated with the respective possibly-intended input, and (ii) a likelihood that the transition between the at least two intended input states corresponds to the possible transition between the at least two possible input states; (d) selecting, based on at least one determined respective likelihood, at least one possibly-intended input; and (e) causing a visual display of the selected at least one possibly-intended input.

These as well as other aspects, advantages, and alternatives will become apparent to those of ordinary skill in the art by reading the following detailed description, with reference where appropriate to the accompanying drawings.

DETAILED DESCRIPTION

Figure 1:
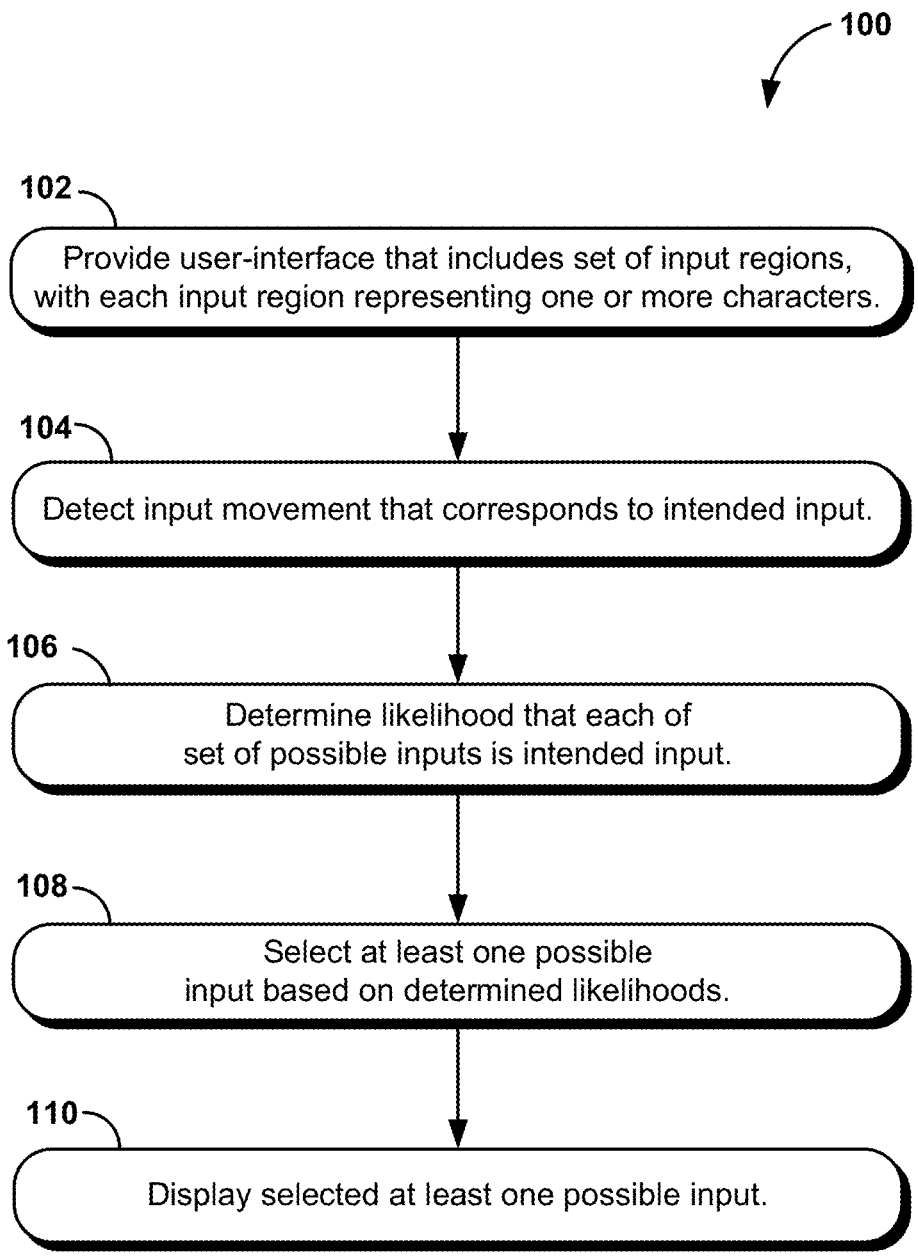
FIG. 1 is a simplified block diagram of an example method.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that aspects of the present disclosure, as generally described herein, and illustrated in the figures, can be arranged, substituted, combined, separated, and designed in a wide variety of different configurations, all of which are contemplated herein.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Some of the following exemplary embodiments describe a computing system performing certain functions including, for example, detecting, processing, storing, and displaying functions. However, some exemplary embodiments may not involve the computing system directly performing all recited functions. For example, a computing system that is communicatively-connected to external sensors may detect an input movement by receiving data representing the input movement from the connected sensors, instead of directly detecting the movement. As another example, a computing device may cause an analysis of an input movement to be performed by transmitting data representing the input movement to a remote server system and then receiving analysis data from the remote system.

1. OVERVIEW

The exemplary methods and corresponding apparatuses and systems discussed herein enable a system to receive character string input (e.g., words, numbers, mathematical expressions, symbolic strings, etc.) by detecting and interpreting an input movement across a user-interface. A touch-based computing system may, for instance, detect an input movement by tracking the path of a pointing element (e.g., a stylus or finger) as it is dragged across a contact-sensitive input surface (e.g., a touch-sensitive screen or external touch pad). Then, the system may interpret the detected input movement. For example, if the system presents numerical digits on a graphical interface, and a detected input movement starts near the "5" digit and moves towards the "3" digit, then the system may interpret this pattern as intended to represent the number "53".

In an exemplary embodiment, the system may interpret the detected input movement using, at least in part, a Hidden Markov Model (HMM). Briefly, an HMM assumes that the process of inputting the input movement includes a series of successive transitions from one input state to another. For instance, if a user is attempting to input "53", the user would begin at one input state (in this case, inputting a "5") and then transition to a second input state (inputting a "3"). Since the system ultimately determines what the user intends to input by interpreting the input movement, the intended input states are considered "hidden" from the system. The system may, therefore, use a statistical model (in this case, an HMM) to infer which input states were intended for input. In practice, this technique may include taking several possible user-inputs and determining a likelihood that each possible user-input is the intended user-input.

After applying the HMM to the input movement, an exemplary computing system may select one or more of the possible user-inputs based on the determined likelihoods. Then, the system may cause the selected user-inputs to be displayed so as to indicate to the user what the computing system has inferred are the possibly-intended user-inputs. In some cases, after the one or more selected user-inputs are displayed, the system may receive further user-input particularly selecting one of the displayed user-inputs. In some embodiments, the determination of likelihoods, selection, and display of possible user-inputs may be performed while the user-input is being received (i.e., as the user continues to enter characters of a particular character string).

2. EXAMPLE METHODS

FIG. 1 is a simplified flow-chart illustrating an exemplary method 100. As shown in block 102, method 100 involves providing a user-interface that includes a set of input regions, with each input region representing one or more characters. Method 100 also involves, at block 104, detecting an input movement that corresponds to an intended input. At block 106, method 100 involves determining a likelihood that each of a set of possible inputs is the intended input. The method also involves, at block 108, selecting at least one possible input based on the likelihoods determined at block 106. Further, at block 110, the method involves displaying the at least one possible input that was selected at block 108.

a. Example User-Interface

At block 102, example method 100 involves providing a user-interface including a set of input regions that are each associated with at least one of a set of characters. Generally, the user-interface may be any user-interface that provides a set of input regions, regardless of, for example, shape, size, number, or arrangement of the input regions. The user-interface may be communicatively coupled to a graphical display that may provide a visual depiction of the input regions of the user-interface along with a visual depiction of the position of a pointer relative to the input regions. The graphical display may provide other visual depictions, including those involving the user-interface and those not involving the user-interface, as well.

Figure 2A:
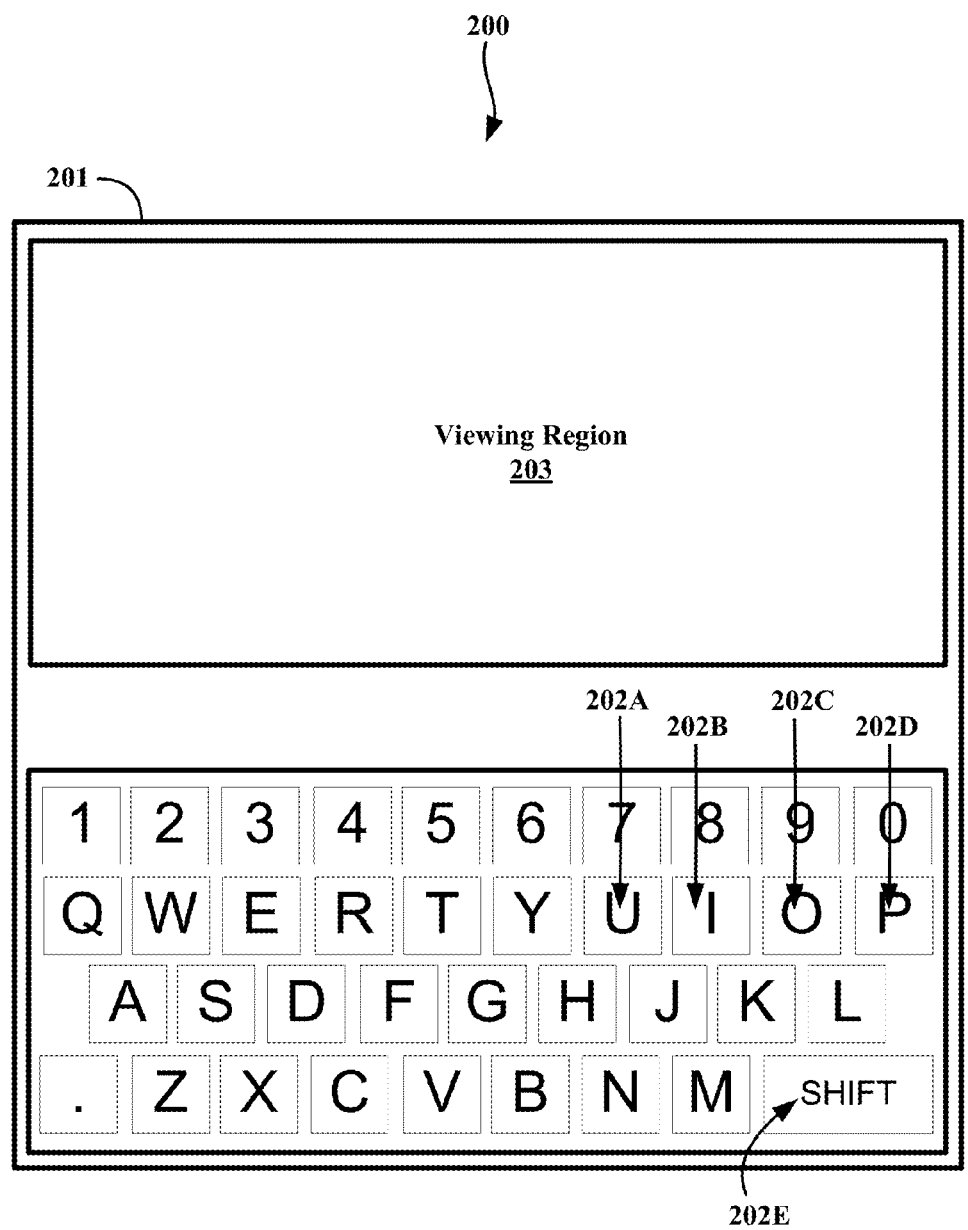
FIG. 2A shows aspects of an example user-interface.

With reference to FIG. 2A, example user-interface 200 is shown. It should be understood, however, that example user-interface 200 is shown for purposes of example and explanation only, and should not be taken to be limiting.

Example user-interface 200 is arranged to provide plurality of input regions (for example, input regions 202A-D), with each input region representing a character (for example, input regions 202A-D represent the letters "U", "I", "O", and "P" respectively). As noted above, in an example embodiment, user-interface 200 may be a touchscreen, having a touchpad embedded into a graphical display, and may be arranged to depict the set of input regions. In another embodiment, user-interface 200 may be a touchpad. In an embodiment where user-interface 200 is a touchpad, a visual depiction of the user-interface may be provided on a graphical display that is physically remote from the movable object or touchpad (e.g., a graphical display of an HMD). Other embodiments of user-interface 200 are certainly possible as well, including, but not limited to, any of the user-interfaces discussed above.

Further, the methods described herein may be applied to a movable pointing device that is communicatively coupled to a graphical display. In such an example arrangement, the input regions may exist entirely virtually (as depicted by a graphical display) and a user may carry out input movements between such input regions by moving a virtual pointer between the input regions using the movable pointing device.

In an example arrangement, each input region may be associated with one or more characters. For example, an input region may be associated with a primary character from a set of primary characters. As another example, an input region may also, or alternatively, be associated with a subset of secondary characters from a set of secondary characters. Input regions may also be associated with one or more computing commands.

Figure 2B:
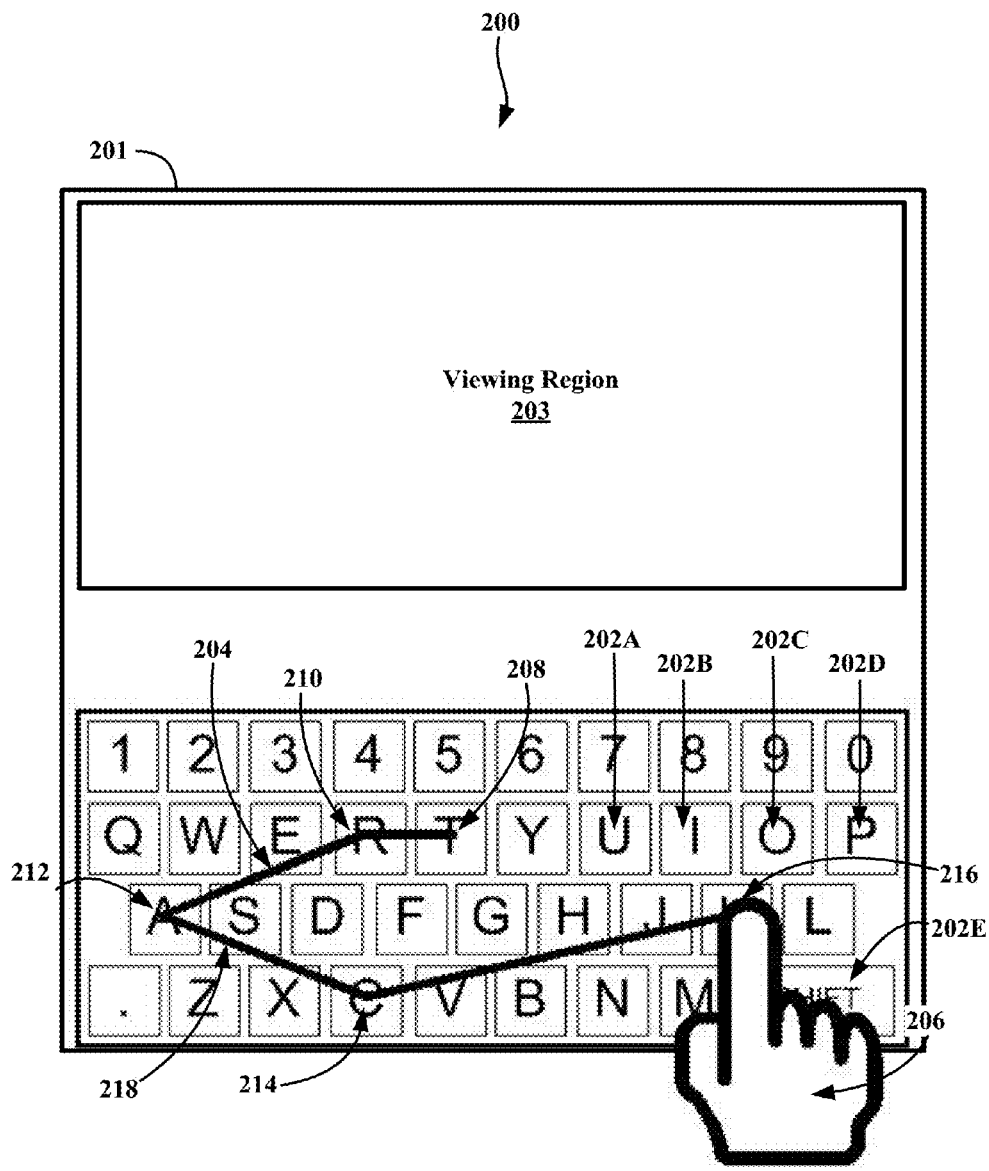
FIG. 2B shows an example input movement across the example user-interface shown in FIG. 2A.
Figure 2C:
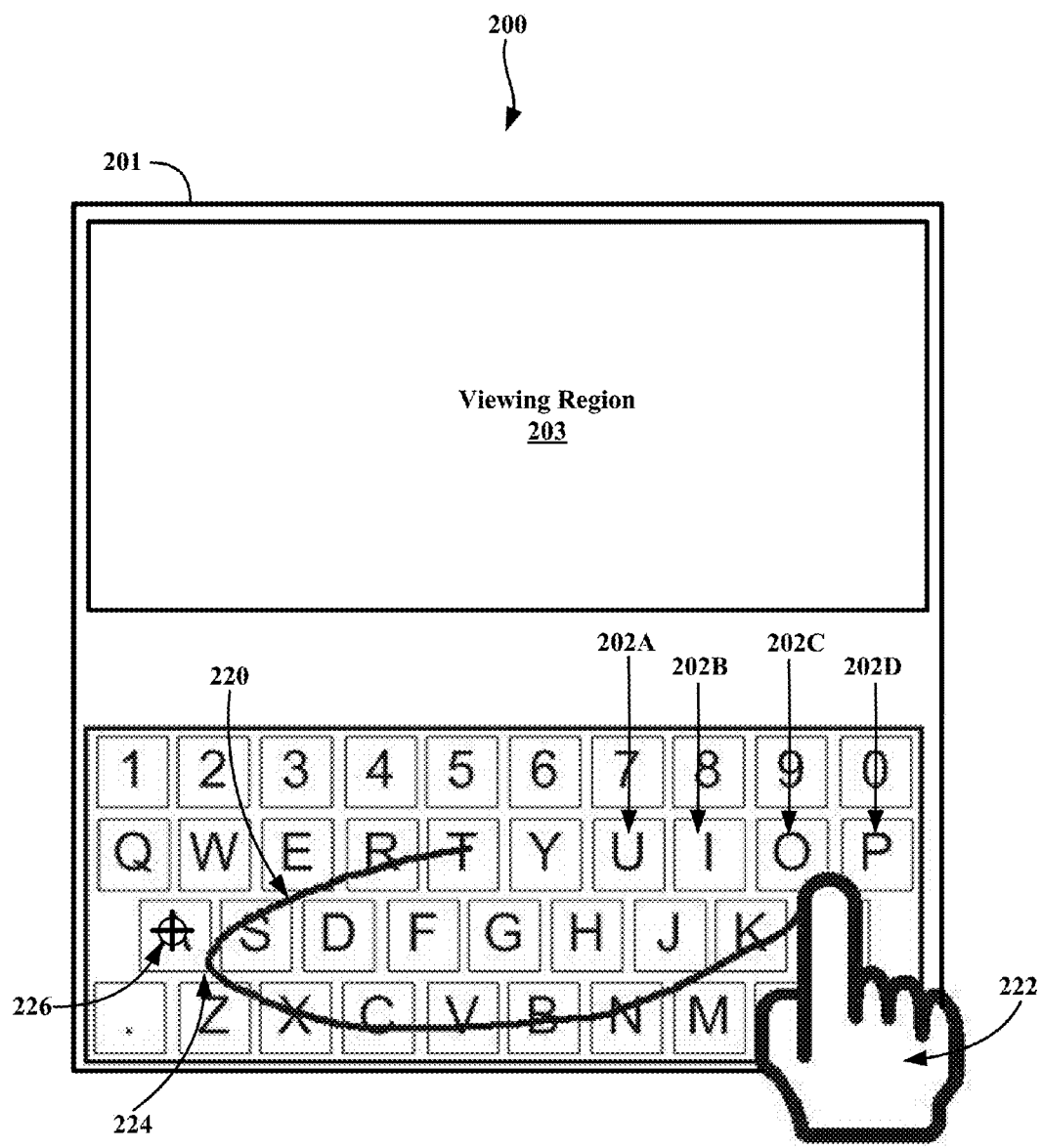
FIG. 2C shows another example input movement across the example user-shown in FIG. 2A.

With reference to the example embodiment shown in FIGS. 2A-2C, graphical display 201 depicts a plurality of input regions. Graphical display 201 is, in appearance, an arrangement that users may be familiar with by way of their use of, for example, computer keyboards and/or typewriting machines. More specifically, graphical display 201 provides input regions arranged in a common QWERTY keyboard layout, with an input region associated with each of the numbers "0" through "9", an input region associated with each letter of the English alphabet, and an input region associated with the "." character. It should be understood, however, that example embodiments are in no way limited to this specific set of characters or a particular layout.

As shown, graphic display 201 may display various input regions 202A to 202E of user-interface 200. Each input region 202A to 202E may be associated with a primary character from a set of primary characters and a subset of secondary characters from a set of secondary characters. For example, input region 202A of user-interface 200, is associated with primary character "U". In an exemplary embodiment, input region 202A may also be associated with a secondary character (e.g., "u"). As another example, input region 202B, of user-interface 200, is associated with primary character "I", and, in turn, may also be associated with secondary character "i". In some cases, the graphical display may indicate the secondary (or tertiary, etc.) character with which an input region is associated.

Herein, for purposes of explanation, the input regions shown in user-interface 200 may be referred to by reference to the primary character with which they are associated. Thus, input region 202A, as depicted by graphical display 201 of user-interface 200, may be referred to as the "U region," input region 202B, as depicted by graphical display 201 of user-interface 200, may be referred to as the "I region," and so on.

In an example arrangement, input regions may also, or alternatively, be associated with one or more computing commands. For example, as depicted by graphical display 201, input region 202E is associated with a computing command indicated by the command SHIFT. This computing command may cause the computing system to, for example, toggle between primary and secondary characters.

The primary (or secondary, or tertiary, etc.) character with which a given input region is associated also may include one of various symbol characters including, but not limited to, "*", "#", "@", "$", "%", """, "&", "+", and "=". Though the shown examples are certain letters, numbers, and symbols associated with one alphabet or numbering system (i.e., the English alphabet), many other symbols and markings may be considered a character for this discussion. For instance, languages that use multiple-stroke symbols may be represented such that each stroke is a character and a string of strokes indicates a symbol. Other examples of primary characters and/or secondary characters are certainly possible as well and the examples discussed herein should not be taken to be limiting.

The computing commands that a given input region may be associated with may include computing commands that are generally used for entering, modifying, or otherwise editing strings of characters. For example, the computing commands may include a command to delete a character, a command to enter a space, a command to enter a suggested string of characters, a command to display additional symbols that various input regions may be associated with, and/or a command to enter a "hard return."

Alternatively, the computing commands with which a given input region is associated may include computing commands that are generally associated with executing a particular application on a computing system. As one example, a computing command may execute a sound recording application, which may be used for purposes of speech recognition. Those of skill in the art will appreciate that other examples of computing commands are certainly possible as well. Generally, the computing commands referred to herein may be any computing function that may be executed by a computing system.

A user-interface may also contain elements other than the input section. For example, user-interface 200 contains viewing region 203, which may display, for example, user-inputs. Additionally, the set of input regions in graphical display 201 also have spaces between adjacent input regions. Such spacing may help to better define the location of each input region.

Although above various characters and/or computing commands are described as being associated with various input regions, input regions may be associated with other characters, computing commands, or other computing functions. Further, user-interface 200 may be capable of being dynamically arranged in a customized manner so that the input regions of the user-interface are associated with characters and/or computing commands that are most useful to the user. As one example, if a user regularly uses a particular computing application, a user may assign to a particular input region a command to execute the particular computing application. As another example, a user may assign to a particular input region a computing command to execute a particular macro routine so that the particular macro routine may be conveniently executed while using, for instance, a computing application that the user regularly runs.

User-interface 200 may be part of, or otherwise communicatively coupled to, a computing system as will be discussed further with reference to FIG. 7.

b. Detecting an Input Movement

As discussed above, example user-interface 200 may be generally configured to detect, recognize, track, or otherwise sense movement of a pointing element to, from, and/or between input regions. At block 104, exemplary method 100 involves detecting an input movement that corresponds to an intended input. For example, in an example embodiment where user-interface 200 is a touchscreen or touchpad, user-interface 200 may be configured to detect the movement of a user's finger, a stylus, or other pointing element, across the surface of the touchscreen or touchpad to, from, and/or between input regions. Upon detecting such movement, user-interface 200 may be configured to generate data indicating the movement, which user-interface 200 may generally make available for use by other components of a computing system (such as computing system 700, discussed further below), perhaps by way of system bus (such as system bus 706, discussed further below). For example, as generally discussed above, user-interface 200 may transmit data indicating an input movement to a processor (such as processor 702, discussed further below) for purposes of executing any of the functions described herein, including, but not limited to, those functions described with respect to FIG. 1.

Accordingly, therefore, an input movement may represent any movement of a pointing element across or over a portion of the user-interface. For purposes of illustration, FIG. 2B shows an exemplary graphical interface 200 that is divided into several input regions (for example, input regions 202), with each input region representing a character. For example, input regions 202A to 202D represent the characters "U", "I", "O", and "P", respectively. FIG. 2B also shows input movement 204 that traces an example path of pointing element 206 across graphical display 201 of user-interface 200. In particular, input movement 204 begins at point 208 and then moves through inflection points 210, 212, and 214, finally stopping at endpoint 216. In this system, each point 208, 210, 212, 214, and 216 may be an observed input state (i.e., a state detected by the computing system).

An input movement may relate to an intended user-input. An intended user-input may, for instance, be a character string. Examples of character strings may include words, numbers, mathematical expressions, sets of words, formulas, multi-stroke symbols, and/or any combination of character strings. Each character string may include one or more individual characters and each character may be associated with one or more input regions. Accordingly, a portion of each input movement may represent each character.

To illustrate, input movement 204 includes input states represented by points 208-216. One possible intended user-input that may be inferred from input movement 204 may correspond to the word "TRACK". In this case, beginning point 208 may be associated with a T region, inflection point 210 may be associated with an R region, inflection point 212 may be associated with an A region, and so on.

Between input states, an input movement may include transitions between successive input states. For instance, in the example of input movement 204 representing the word "TRACK", straight portion 218 of input movement 204 may represent a transition between an input state representing an "A" and an input state representing a "C".

Input movement 204 may be detected and represented in a variety of ways. For example, a computing system may receive data representing the position of pointing element 206 at given time increments and store this position data as a representation of the detected input movement. Such position data may be represented according to an "x coordinate" and/or a "y coordinate." Other representations may be possible as well.

Additionally or alternatively, position data may be processed to indicate the instantaneous rate of movement of the input movement at each of the given time intervals. For example, a system may apply numerical differentiation algorithms to the position data to determine the speed and direction with which pointing element 206 was moving across user-interface 200 at a given time. In some cases, a system may only store rate-of-movement data to represent the input movement instead of storing any position data. Input movement data may be further processed to determine higher-order movement data, such as data representing the direction and magnitude of acceleration related to a given input movement. Other examples of analysis of, detection of, and/or representation of input movements may exist as well.

An input movement may relate to the movement that a pointing device makes while maintaining continuous contact with a contact-sensitive element of the user-interface. For example, a computing system may begin tracking the movement of a pointing device when the pointing device makes prolonged contact with the contact-sensitive element and then stop tracking the input movement when the pointing device has broken contact with the contact-sensitive element for longer than a specified time limit. Note that "continuous" in this sense is intended to mean "continuous contact" with the contact-sensitive element of the user-interface rather than, for example, necessarily continuous movement of the pointing device.

Some computing systems may be configured to recognize particular patterns in an input movement and, in response to a particular pattern, carry out a specific command or function. For example, a system may interpret a zigzag across a single input region as indicating that the character associated with the input region should be used twice. As another example, an input movement that stops on a particular input region for longer than a specified time may indicate that a secondary character should be used as opposed to the primary character for this input region.

In some cases, input movements may be tracked outside of the borders of the input regions. For example, if the entire screen of a device is touch-sensitive, and the input regions only occupy part of the screen, then the device may still detect the position of an input movement that is on the screen but outside of all of the input regions. In some implementations, movement outside of all input regions may be interpreted as a portion of a transition between input regions.

In other implementations, input movements beyond the boundaries of all input regions may produce specific actions from the computing system. For example, a computing system may be programmed to carry out a specific function when an input movement moves to outside of all the input regions. In particular, if a computing system detects that an input movement moves to an area that is to the right of all the input regions, the device may perform an ENTER command. As another example, if an input movement is detected to move above all the input regions, the system may switch from using primary characters to using secondary characters for each input region. Other commands, implementations, and functions may be used in addition to or instead of the described techniques for interpret input movements that are outside of all input regions. In some cases, user-preferences may specify how the system should receive and interpret input movements, including input movements that are outside of all input regions.

Example input movement 204 shows straight movements from the center of one input region to the center of another input region, with clear inflection points at the center of the T, R, A, C, and K regions. In practice, an input movement may not conform to such an ideal path. For example, an input movement may not have an inflection point at each intended input region. For instance, an input movement across user-interface 200 that represents the word "PUT" may not change direction at the U region, because a straight path between the P region and the T region passes through the U region without needing to change directions. Further, transitions between input regions may move in more circuitous routes from one region to the next region. Additionally, an input movement may not pass through the center of each intended input region (or through any portion of some intended regions).

To illustrate, FIG. 2C shows user-interface 200 with an exemplary input movement 220 that may represent the word "TRACK". Unlike input movement 204 shown in FIG. 2B, input movement 220 does not move directly through the center of each intended input region and the transitions are not straight between each intended input region.

Some deviations from ideal input movements may be considered contextual effects, because the context of the input state will influence the behavior of the input movement. Examples of such context may include a previous input state, a subsequent input state, a relationship between previous input states, a relationship between subsequent input states, a relationship between previous and subsequent input states, the location of previous or subsequent input states, the location of the current input state, the previous or subsequent use of input command regions, and/or the previous or subsequent use of special patterns. Other contextual effects may exist as well. In short, any given input state may be impacted by the state the proceeded or follows it.

Some deviations from ideal input movements may result from user- or system-errors. For example, a user may move a pointing element to an unintended input region before arriving at an intended input region. As another example, before beginning an input movement, a user may make unintentional contact with a contact-sensitive element. In such a case a "fumble model" may be used to remove any ambiguity from the user's input resulting from any touch interaction the user may have with the touch pad prior to the user initiating the intended input movement. One such "fumble model" is briefly described in section 4 below.

As yet another example, a contact-sensitive element may malfunction and erroneously detect that a pointing element has broken contact with the element. In some embodiments, the computing system may be configured to recognize potential errors and ignore the erroneous results. For example, if a brief contact or break in contact comes very near the start or end of an input movement, a system may ignore the brief contact or break in contact.

In some cases, a single input state may be indicative of more than one character. For instance, as previously discussed, specific patterns c. Determining Respective Likelihood for Possible User-Input Those of skill in the art will appreciate that a Hidden Markov Model (HMM) is a statistical model that may be used to determine state information for a Markov Process when the states of the process are not observable. A Markov Process is a process that undergoes successive transitions from one state to another, with the previous and next states of the process depending, to some measurable degree, on the current state.

For example, in the process of inputting a string of characters, each character may represent a state. In this case, the possible states of the process are all the characters in the user-interface, and the string of characters represents several successive transitions from one character to another. A Markov model for this process may determine, given the current character, the probability that each possible character will be the next character in the string. For instance, if the current input state represents entering the letter "T", a Markov model may give, for each possible character, a respective probability that the character will be the next in the string. In particular, the transition probability of "T" to a particular character may be determined by referring to a list of likely character strings (e.g., a dictionary) and counting the frequency of this transition relative to all other possible transitions (i.e., transitions from "T" to a character other than the particular character).

Figure 3A:
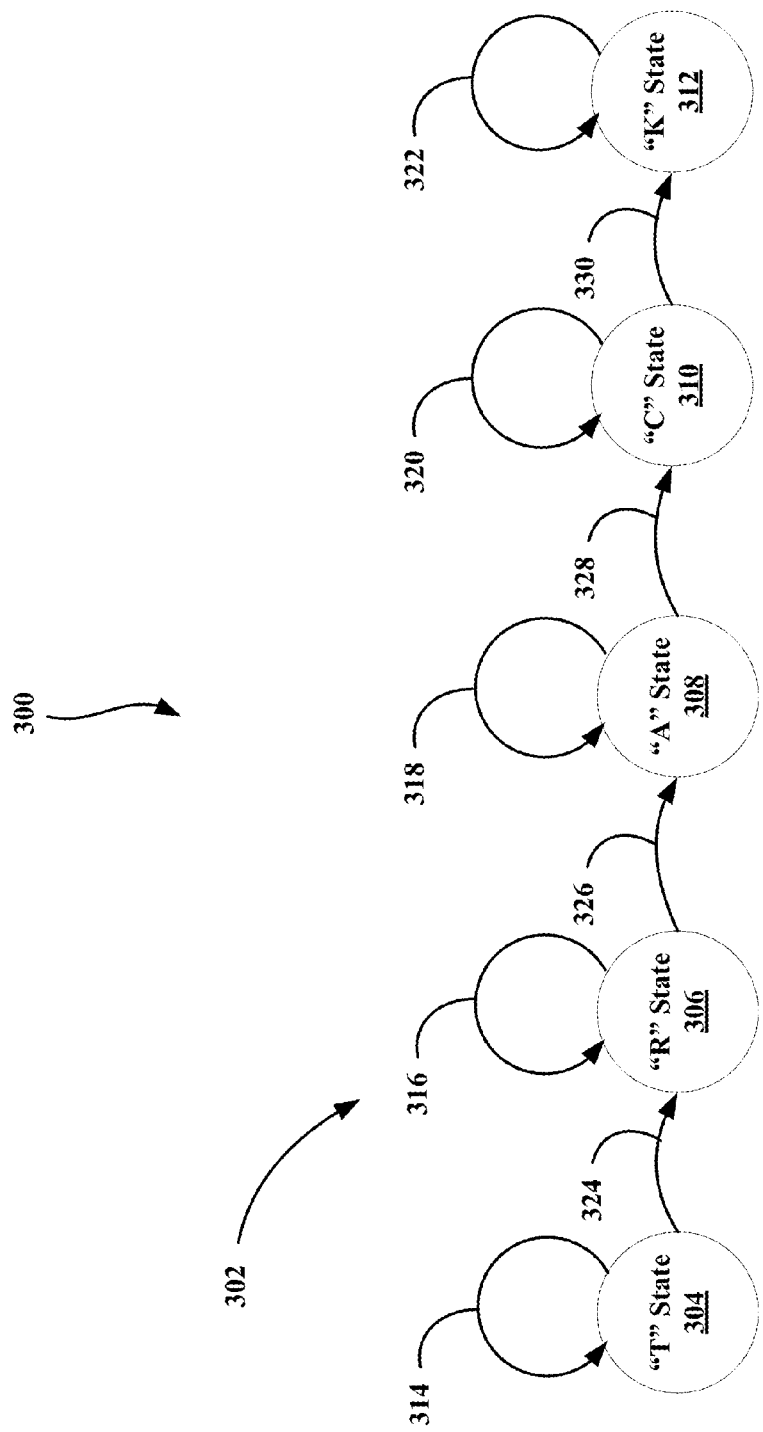
FIG. 3A shows an example state diagram.

To illustrate, FIG. 3A shows features of an exemplary Markov model 300 as a state diagram. In particular, input states "T", "R", "A", "C", and "K" are shown on the state diagram as input states 304-312. FIG. 3A also shows several possible state transitions 314-330 between input states 304-312. For example, transition 314 represents the possible transition from T state 304 back to T state 304, while transition 328 represents the transition from A state 308 to C state 310. Markov model 300 may define transition probabilities associated with these transitions. Given a starting input state of "T", the probability of entering the string "TRACK" may be determined as the product of the probabilities associated with transitions 324-330. In practice, Markov model 300 may also include many other characters and transitions.

An HMM models a Markov process in which the states may not be directly observable. For instance, if a system is trying to infer an intended character string from observations (e.g., an input movement), then, in addition to transition probabilities, the current state may also be uncertain. Therefore, the system may use an HMM to determine the probability that a certain part of the observation relates to a particular state. For example, a system that recognizes an inflection point as indicative of an input state may determine the probability that a given inflection point is indicative of a particular character.

To illustrate, input movement 220 has an inflection point 224 near the center 226 of the A region 228. An exemplary system may, based on an HMM, assign a state probability to the possible "A" input state based on the distance of inflection point 224 from center 226. If, therefore, the inflection point were further from center 226, the system may assign a lower probability to the "A" input state. Additionally, the system may assign state probabilities for each of the other characters represented on user-interface 200 based on the distance of each representative input state from inflection point 224. As will be discussed, a system may also use numerous other features of an input movement or process to assign state probabilities from an HMM.

Figure 3B:
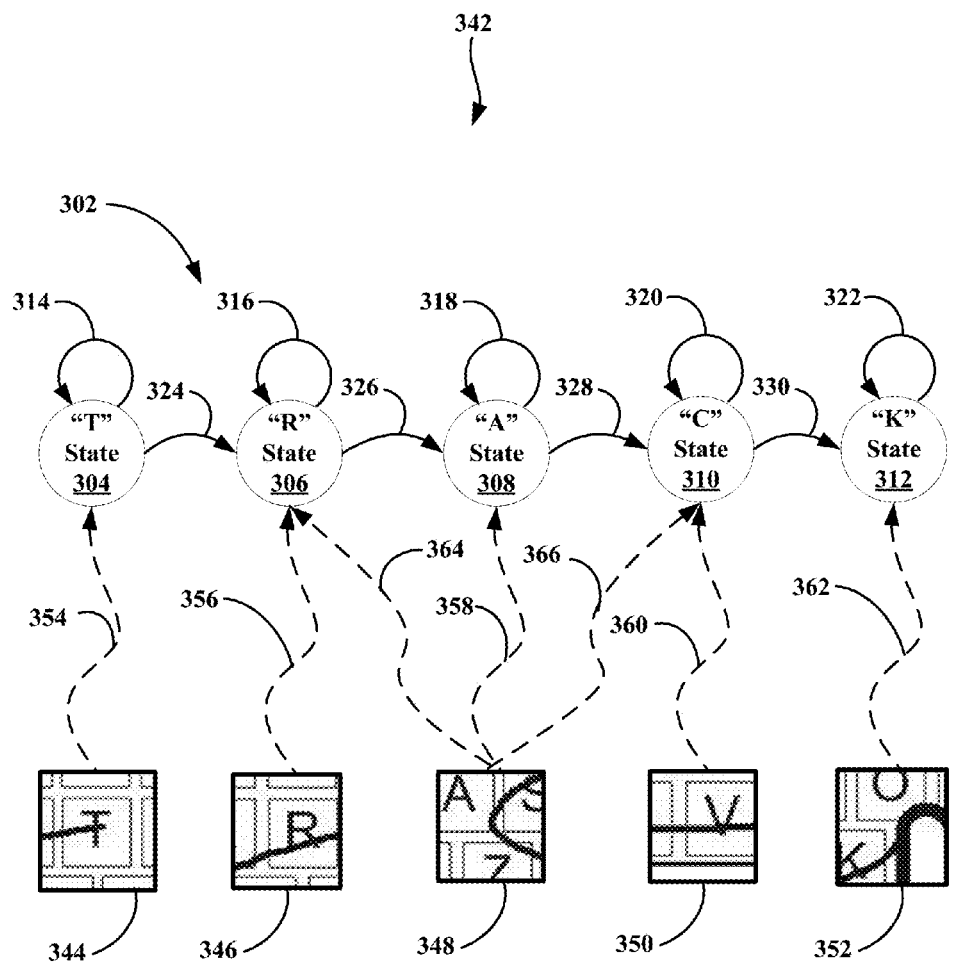
FIG. 3B shows an example state diagram.

Based on state and transition probabilities, a system may determine the probability that an input movement is indicative of a given character string. To illustrate, FIG. 3B shows features of an exemplary HMM 342 as state diagram 302 with associated input movement features 344-352 from input movement 220. In particular, input states 304-312 are each associated with one observation state 344-352 by a state probability 354-362.

For purposes of illustration, observation 348 is also shown to be associated with input states 306 and 310 by probabilities 364 and 366. As an example process starting with observation 346, a system may determine the probability that the next input state will be an "A" by using the state probability 356 in combination with the transition probability 326. This step may be simplified by associating observation 346 with only one state probability 356. As another example, given observation 348, the probability that the next input state will be "A" state 308 may be determined using a combination of state probabilities 358, 364, and 366 in combination with transition probabilities 318 and 326. Specifically, the probability of state 308, given observation 348, may be the sum of three terms: (1) the product of state probability 364 and transition probability 326, (2) the product of state probability 358 and transition probability 318, and (3) the product of state probability 366 and transition probability 328. Other numerical implementations may also be used.

Figure 3C:
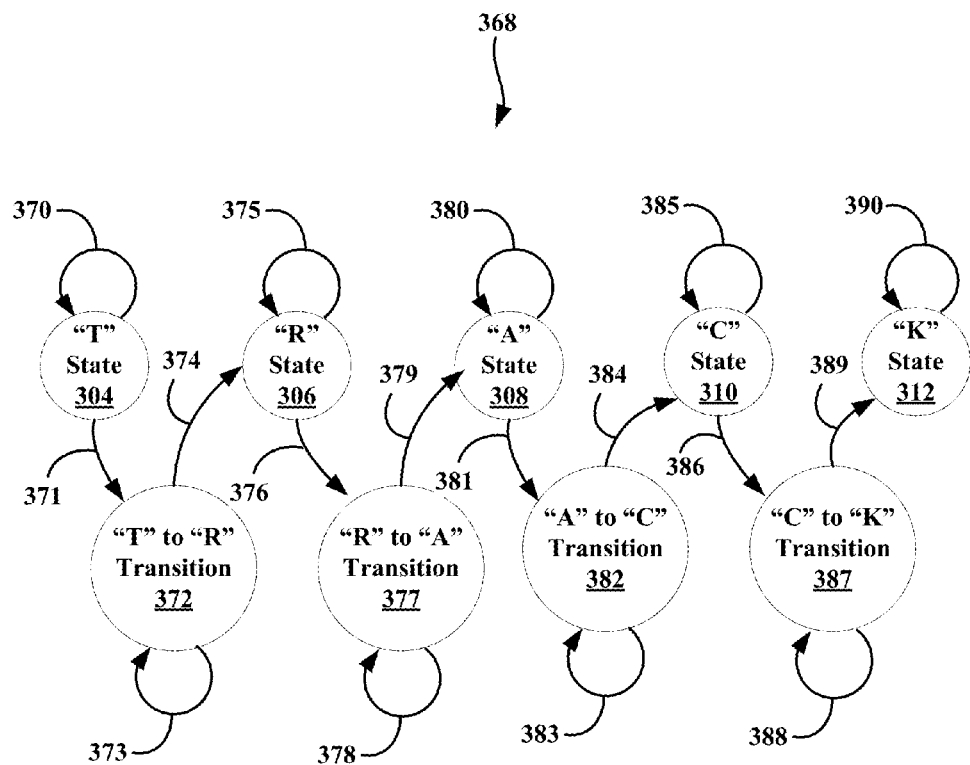
FIG. 3C shows an example state diagram.

In some cases, since the input movement may track both the input and the transitions between inputs, an input state may represent a transition. Then, a respective state probability may be assigned for each section of the input movement as indicative of either an input state or a transition state. In this case, an observation state may represent one detected position, and each transition may represent the changing or not changing to a new state. FIG. 3C illustrates aspects of such an HMM 368. As shown, given a starting state of 304, the system may continue to receive user-input representing a "T" (by path 370) or change to transition state 372 (by path 371). Therefore, each detected point on an input movement may be indicative of one state or another and each observation may have associate state probabilities from which to determine a likely state.

A system may determine the state probability of a particular character or set of characters, based on several factors. For example, a system may use the distance of the input movement from the center of an input region as a basis for determining the probability that the input state represents the input of a character. Additionally, the rate of movement near an input region may be used as a factor to determine whether a character is intended. Further, the system may use the acceleration of the input movement near an input region as a factor for determining the state probability of a particular character. Further still, a system may consider contextual effects, preferences, and/or unintended input states as bases for determining how likely it is that a portion of the input movement represents a particular character.

As noted, a computing system may use the distance of the input movement from an input region as a basis for determining a state probability for a particular character. In practice, a system may use the shortest distance that the input movement comes to the center of the input region as the distance of the input movement from the input region. Some implementations may additionally or alternatively use the distance of the input movement from other points within or near an input region. For example, if a character is associated with an input region that is close to the left edge of the user-interface, the system may use the distance of the input movement from a point that is on the right-hand side of the associated input region to determine the state probability of the character.

As also noted, the acceleration of the input movement may be a basis for determining the state probability of a particular character. For example, if the input movement is changing direction when it moves closest to an input region associated with a character, a computing system may increase the likelihood of this character based on the acceleration of the input movement. As another example, if an input movement slows down and/or speeds up very near an input region, then a system may increase the likelihood that the character associated with this input region is an intended character. Correspondingly, if an input movement does not accelerate as it passes over several input regions, a system may treat these input regions as less-likely associated with an intended input state.

As also noted, the rate of movement of the input movement may be a basis for determining the state probability of a particular character. For example, a system may set a threshold rate of movement (e.g., a certain speed or direction) and, when the input movement moves with a slower rate than the threshold rate of movement, the system may increase the likelihood that an input state may be located near this slower portion. Additionally, the rate of movement may be used as a weighting factor for the likelihood that an input region is associated with an intended character. For example, if the instantaneous rate of movement of an input movement is particularly slow at its shortest distance from a certain input region, the likelihood of this input region may be increased as a result. In like manner, the likelihood of an input region may be decreased if the input region is closest to the input movement at a point where the input movement has a relatively high rate of movement.

Contextual effects, unintended states, and preferences may also be used as factors in determining state probabilities for possibly-intended characters. As an example of a contextual effect, if a user-input represents an English word, and the input movement does not move directly through any vowels (e.g., movement 220 only touches the corners of the A region and the E region) then the likelihood of vowels that are near the input movement may be increased since most English words contain at least one vowel.

To determine whether an input state is unintended, a system may employ any of several techniques. For example, a system may compare all inputs that include the input state to a list of likely user-inputs (for instance, a dictionary, a table of formulas, etc.) and treat the input state as unlikely if few or no user-input states from the list include this input state. In a similar example, if an input state represents a common error in a particular user-input (for example, if a user misspells a commonly-misspelled word), then the system may increase the likelihood that this mistake represents one or more unintended states or states that are not in their intended order (e.g., "HAMPSTER" instead of "HAMSTER" or "PEICE" instead of "PIECE"). A system may also determine an input state to be unintended because of a particular feature of the movement during this state. For example, an input movement that pauses in one position for a long time may indicate that the user is searching for the next intended character. Hence, movements directly before such a pause may represent an erroneous movement, because the user was unsure of where to move the pointing element next. Such unintended input states may be considered "garbage states" and may ultimately be disregarded by the computing system.

User- or system-preferences may be used in a variety of ways to affect the determination of a state probability for a particular character. For example, user-preferences may indicate a customized or ranked list of likely-intended user-inputs. As another example, user-preferences may indicate the typical rates of movement, accelerations, and positions with which a user produces an input movement to determine more accurate probabilities for input states. System preferences may determine, for instance, how intensive a determination step the system should use. For example, if the computing system has very low processing resources, then the system preference may indicate that fewer criteria should be checked in determining whether an input state is likely intended.

The transition probabilities may also be determined based on a number of similar factors. As with other statistical models, an HMM may be specially-trained to a particular purpose. In the example of words in one language, a preliminary training may be accomplished by simply counting the number of times a particular transition occurs in the language used. More advanced training may include contextual effects, such as where in a word the transition typically occurs or how often this transition occurs in combination with another particular transition. Then, the transition probabilities may be further refined as user-inputs are entered in actual use, so that the HMM represents a model that specifically fits its application.

One aspect of using a substantially continuous input movement is that the transitions may also be compared using distance, rate of movement, acceleration, context, and other techniques, as opposed to simply using predefined probabilities. For instance, the transition from the A region to the P region in user-interface 200 is relatively long, producing many possible input states between these input regions. Therefore, to determine if this transition is likely, the rate of motion between these regions may be compared to a typical rate of motion for such transitions and the transition probability may be weighted accordingly.

Since an HMM may determine the likelihood of states and transitions, separate from the likelihood of a whole user-input, the determination of the whole user-input may be carried out while the user-input is still being entered. For instance, as a system recognizes several likely input states and transitions, the system may compare these successive states to a list of likely user-inputs. Especially in longer character strings, this process may determine that one or more user-inputs are quite likely, before the user-input is fully entered. Then, the steps of selecting possible user-inputs (block 108) and displaying these user-inputs (block 110) may be carried out to reduce input time.

In some embodiments, a computing system may determine the likelihood of user-inputs without using a predefined list of likely user-inputs. For example, if several input states are likely based on an HMM analysis of the input movement, but the user-input is not recognized in a dictionary, the system may create a new submission to the dictionary, based on the input movement. Some implementations may supplement this feature with a predefined list of likely inputs. Then, user-inputs that are not included in the list may be assigned a lower likelihood than corresponding user-inputs that do appear in the predefined list.

Many general algorithms for determining such probabilities from a given HMM are known in the art. For example, the forward algorithm or Viterbi algorithm may be applied to many user-inputs. As another example, if the system determines the likelihood of a user-input after the input movement is completed, then a forward-backward algorithm (in which a probability is determined from the start of a string transitioning toward the end and a probability is determined from the end of a string transitioning toward the start) may be applied to determining the likelihood of a possible user-input.

The process of collecting and analyzing data to produce an HMM, called training, typically involves two types of training: supervised and unsupervised. Supervised training involves the creation of a general model by analyzing the observations that result from known (i.e., not hidden) sequences of states. Unsupervised training involves a system continuing to receive data and iteratively creating a model. Unsupervised training may begin with a general model and involve adapting this model based on new data.

Supervised training may involve a number of different techniques. For instance, counting the occurrences of each character in a database of likely user-inputs may help a system to generate respective probabilities for each character. For instance, since the letter "E" is used in English more often than the letter "Z", a system for entering English words may assign a higher state probability to the state of intending to input an "E" than the state of inputting a "Z".

As another example, supervised training of a character entry system may involve the system prompting users to enter predefined character strings, receiving user-input, and then correlating the observed inputs to the known intended input to determine state probabilities. In particular, if several users are prompted to enter words that include the character "A" on user-interface 200, a system may find the closest point that each input movement comes to the center of the A region and use the set of closest points as a representative distribution of positions that represent an "A" input state. By creating position distributions for each letter, the HMM may associate each position on a user-interface with a probability that an input movement through this position represents each character.

Such a training technique may also be applied to any other factors that influence state probabilities (e.g., contextual effects, acceleration tracking, rate of movement tracking, unintended states, etc.). For instance, if the letter "G" is intended input in a supervised training process, the system may chose many contexts in which a G may be used to create a general position distribution for the input "G" state. Then, the system may use subsets of this data (for instance, all "G" inputs at the end of a word or all G inputs coming after an "O" input state), in order to determine specific characteristic that relate to context.

Additionally, a system may use supervised training to determine transition probabilities. For example, by counting the occurrences of each transition in a database of likely user-inputs, a computer system may generate respective probabilities for each transition.

Unsupervised training may likewise involve a variety of procedures. For instance, a system may store all the previous data that was used to create the existing HMM and then, each time another character string is entered, create a new HMM based on the combination of the previous data and the new data.

As another example, a system may store only the parameters of the HMM, without storing the actual previous data. Then, the system may update the model using new data by assigning a particular weight to both the old parameters and new data and then creating a new model. Alternatively, the system may only adjust individual models based on new data.

To collect new data for unsupervised training, a system may periodically prompt users to enter predefined input strings. In addition or instead, a system may, after receiving input data, prompt a user to confirm the intended input (for example, by selecting the input from a list of possible user-inputs or by entering the intended input by a different input procedure). In some cases, such a confirmation may be implicit. For instance, if a computing system allows a user to correct mistakes made in inferring inputs, than the user-input that was incorrectly inferred may be associated with its intended input.

d. Selecting and Displaying One or More Possible User-inputs

At block 108, exemplary method 100 involves selecting one or more possible user-inputs based on the determined likelihoods. A system may further base this selection on user-preferences, user-input, context data, or other factors. For example, user-preferences may indicate a threshold level of likelihood that must be reached for a potential user-input to be selected. Additionally, user-input may specify a particular number of potential user-inputs to select. Further, if the context in which a string is used (e.g., if the structure of the sentence before an input word indicates that the word should be a particular element of language, etc.) may indicate whether a possible user-input should be selected.

Figure 2D:
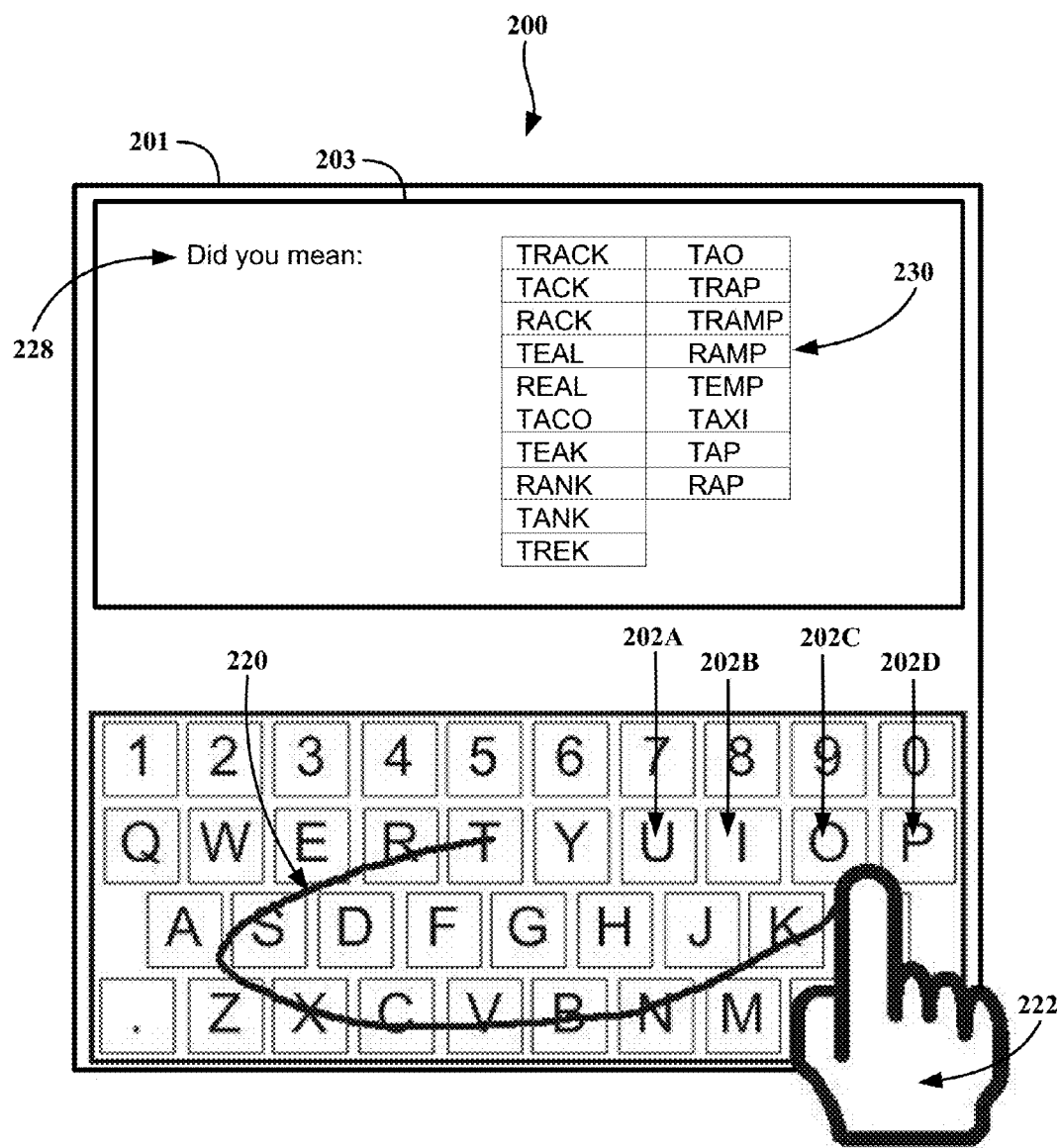
FIG. 2D shows an example input movement and aspects of an example user-interface.

Once a system selects one or more user-inputs, the system may cause a visual display of the selected user-inputs. In some embodiments, the computing system may display the selected user-inputs directly to the user-interface. To illustrate, FIG. 2D shows user-interface 200, including graphical element 201 that further includes several input regions (for example, input regions 202A-D) and a viewing region 203. Additionally, FIG. 2D shows input movement 220 of pointing element 206. Since input movement 220 moves across several input regions, this input movement may represent one of several possible user-inputs. By applying an HMM to input movement 220, the computing system has selected several more-likely possible user-inputs. As shown, a set of these possible user-inputs 208 is displayed in viewing region 203.

In some cases, a visual display may include only a single possible user-input. In this case, the system may display this user-input by adding the selected user-input to an open file or program window. For example, if the user-input is part of an SMS message, then the system may simply add the selected user-input to the message text as the system would add any other user-input.

In other situations, multiple possible user-inputs may be displayed. For example, FIG. 2D shows possible user-inputs 208 in viewing region 203. In this case, a system may receive further user-input indicating one user-input to use as the intended input. For example, user-interface 200 includes, in viewing region 203, a prompt 210 asking a user which word represents the intended user-input. If additional user-input is not received, an exemplary embodiment may involve the computing system selecting a single user-input to use as the intended user-input. In particular, the computing system may select the most likely user-input, based on the hidden Markov modeling as well as other factors described in previous sections.

In some cases, the system may also display the possible user-inputs in a ranked order so that the most likely user-input is placed prominently. In the example of FIG. 2D, the most likely user-input may be "TRACK". Therefore, "TRACK" is displayed in the upper left-hand corner of the list of possible user-inputs. An exemplary system may list selected user-inputs in other ways as well (e.g., alphabetical order, string length order, etc.) As indicated in preceding sections, possible user-input may be selected from predefined lists of possible user-inputs, newly defined user-inputs based on good agreement to the model, or a combination of both. If a computing system selects a combination of predefined and newly-defined user-inputs, the computing system may draw a distinction between these types of possible user-inputs.

3. EXEMPLARY DEVICE AND SYSTEM ARCHITECTURE

In an example embodiment, user-interface 200 and graphical display 201 may be integrated into a system that is configured for receiving, transmitting, and displaying data, such as a wearable computing device. One particular type of wearable computing device is a head-mounted display (HMD). An HMD typically provides a heads-up display near to the user's eyes in such a manner that the user perceives the computer-generated graphics and the physical world simultaneously. In accordance with the systems and methods described herein, the heads-up display may include a graphical display.

Figure 4A:
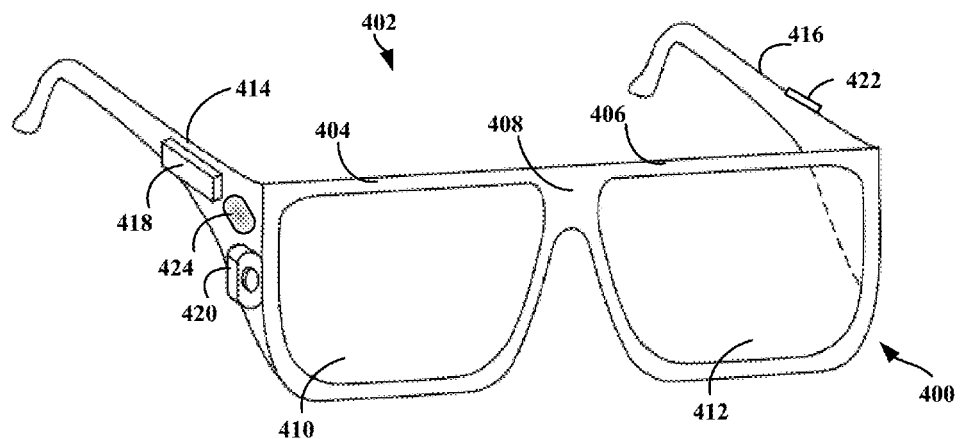
FIG. 4A illustrates an example display system.

FIG. 4A illustrates an example system 400 for receiving, transmitting, and displaying data. The system 400 is shown in the form of a wearable computing device. While FIG. 4A illustrates a head-mounted device 402 as an example of a wearable computing device, other types of wearable computing devices could additionally or alternatively be used. As illustrated in FIG. 4A, the head-mounted device 402 has frame elements including lens-frames 404, 406 and a center frame support 408, lens elements 410, 412, and extending side-arms 414, 416. The center frame support 408 and the extending side-arms 414, 416 are configured to secure the head-mounted device 402 to a user's face via a user's nose and ears, respectively.

Each of the frame elements 404, 406, and 408 and the extending side-arms 414, 416 may be formed of a solid structure of plastic and/or metal, or may be formed of a hollow structure of similar material so as to allow wiring and component interconnects to be internally routed through the head-mounted device 402. Other materials may be possible as well.

One or more of each of the lens elements 410, 412 may be formed of any material that can suitably display a projected image or graphic. Each of the lens elements 410, 412 may also be sufficiently transparent to allow a user to see through the lens element. Combining these two features of the lens elements may facilitate an augmented reality or heads-up display where the projected image or graphic is superimposed over a real-world view as perceived by the user through the lens elements 410, 412.

The extending side-arms 414, 416 may each be projections that extend away from the lens-frames 404, 406, respectively, and may be positioned behind a user's ears to secure the head-mounted device 402 to the user. The extending side-arms 414, 416 may further secure the head-mounted device 402 to the user by extending around a rear portion of the user's head. Additionally or alternatively, for example, the system 400 may connect to or be affixed within a head-mounted helmet structure. Other possibilities exist as well.

The system 400 may also include an on-board computing system 418, a video camera 420, a sensor 422, and a finger-operable touch pad 424. The on-board computing system 418 is shown to be positioned on the extending side-arm 414 of the head-mounted device 402; however, the on-board computing system 418 may be provided on other parts of the head-mounted device 402 or may be positioned remote from the head-mounted device 402 (e.g., the on-board computing system 418 could be connected by wires or wirelessly connected to the head-mounted device 402). The on-board computing system 418 may include a processor and memory, for example. The on-board computing system 418 may be configured to receive and analyze data from the video camera 420, the sensor 422, and the finger-operable touch pad 424 (and possibly from other sensory devices, user-interfaces, or both) and generate images for output by the lens elements 410 and 412. The on-board computing system 418 may additionally include a speaker or a microphone for user input (not shown).

The video camera 420 is shown positioned on the extending side-arm 414 of the head-mounted device 402; however, the video camera 420 may be provided on other parts of the head-mounted device 402. The video camera 420 may be configured to capture images at various resolutions or at different frame rates. Video cameras with a small form-factor, such as those used in cell phones or webcams, for example, may be incorporated into an example embodiment of the system 400.

Further, although FIG. 4A illustrates one video camera 420, more video cameras may be used, and each may be configured to capture the same view, or to capture different views. For example, the video camera 420 may be forward facing to capture at least a portion of the real-world view perceived by the user. This forward facing image captured by the video camera 420 may then be used to generate an augmented reality where computer generated images appear to interact with the real-world view perceived by the user.

The sensor 422 is shown on the extending side-arm 416 of the head-mounted device 402; however, the sensor 422 may be positioned on other parts of the head-mounted device 402. The sensor 422 may include one or more of a gyroscope or an accelerometer, for example. Other sensing devices may be included within, or in addition to, the sensor 422 or other sensing functions may be performed by the sensor 422.

The finger-operable touch pad 424 is shown on the extending side-arm 414 of the head-mounted device 402. However, the finger-operable touch pad 424 may be positioned on other parts of the head-mounted device 402. Also, more than one finger-operable touch pad may be present on the head-mounted device 402. The finger-operable touch pad 424 may be used by a user to input commands. The finger-operable touch pad 424 may sense at least one of a position and a movement of a finger via capacitive sensing, resistance sensing, or a surface acoustic wave process, among other possibilities. The finger-operable touch pad 424 may be capable of sensing finger movement in a direction parallel or planar to the pad surface, in a direction normal to the pad surface, or both, and may also be capable of sensing a level of pressure applied to the pad surface. The finger-operable touch pad 424 may be formed of one or more translucent or transparent insulating layers and one or more translucent or transparent conducting layers. Edges of the finger-operable touch pad 424 may be formed to have a raised, indented, or roughened surface, so as to provide tactile feedback to a user when the user's finger reaches the edge, or other area, of the finger-operable touch pad 424. If more than one finger-operable touch pad is present each finger-operable touch pad may be operated independently, and may provide a different function.

Figure 4B:
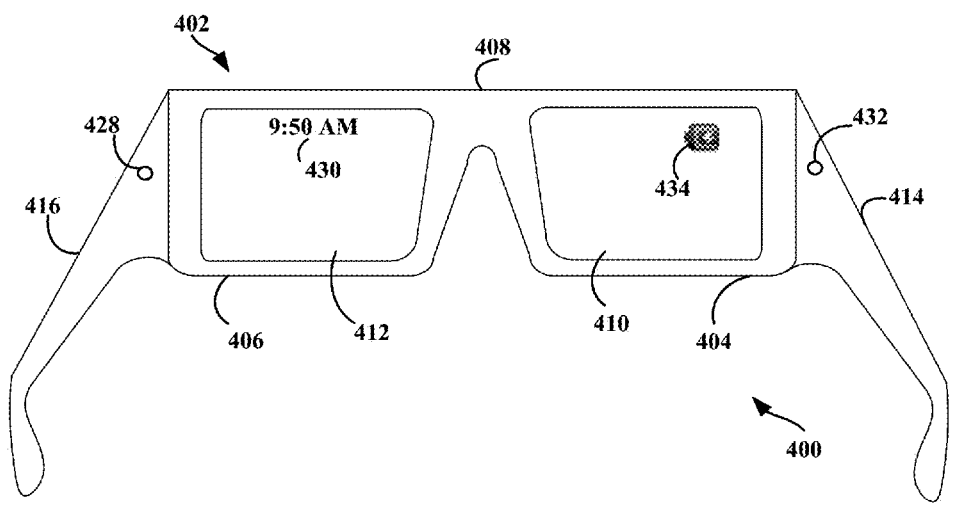
FIG. 4B illustrates an alternate view of the system illustrated in FIG. 4A.

FIG. 4B illustrates an alternate view of the system 400 illustrated in FIG. 4A. As shown in FIG. 4B, the lens elements 410, 412 may act as display elements. The head-mounted device 402 may include a first projector 428 coupled to an inside surface of the extending side-arm 416 and configured to project a display 430 onto an inside surface of the lens element 412. Additionally or alternatively, a second projector 432 may be coupled to an inside surface of the extending side-arm 414 and configured to project a display 434 onto an inside surface of the lens element 410.

The lens elements 410, 412 may act as a combiner in a light projection system and may include a coating that reflects the light projected onto them from the projectors 428, 432. In some embodiments, a reflective coating may be omitted (e.g., when the projectors 428, 432 are scanning laser devices).

In alternative embodiments, other types of display elements may also be used. For example, the lens elements 410, 412 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 404, 406 for driving such a matrix display. Alternatively or additionally, a laser or light emitting diode (LED) source and scanning system could be used to draw a raster display directly onto the retina of one or more of the user's eyes. Other possibilities exist as well.

Figure 5A:
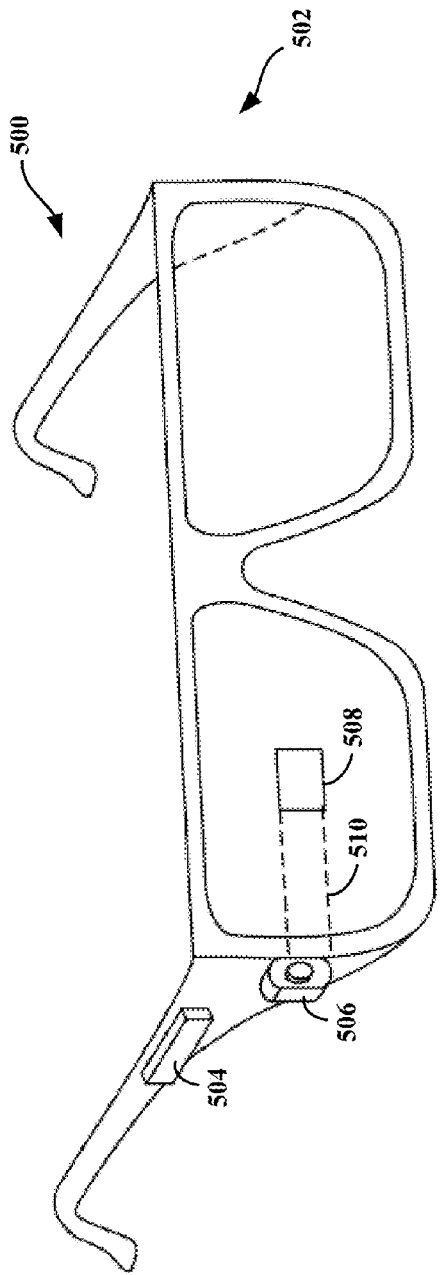
FIG. 5A illustrates an example system for receiving, transmitting, and displaying data.

FIG. 5A illustrates an example system 500 for receiving, transmitting, and displaying data. The system 500 is shown in the form of a wearable computing device 502. The wearable computing device 502 may include frame elements and side-arms such as those described with respect to FIGS. 4A and 4B. The wearable computing device 502 may additionally include an on-board computing system 504 and a video camera 506, such as those described with respect to FIGS. 4A and 4B. The video camera 506 is shown mounted on a frame of the wearable computing device 502; however, the video camera 506 may be mounted at other positions as well.

As shown in FIG. 5A, the wearable computing device 502 may include a single display 508 which may be coupled to the device. The display 508 may be formed on one of the lens elements of the wearable computing device 502, such as a lens element described with respect to FIGS. 4A and 4B, and may be configured to overlay computer-generated graphics in the user's view of the physical world. The display 508 is shown to be provided in a center of a lens of the wearable computing device 502; however, the display 508 may be provided in other positions. The display 508 is controllable via the computing system 504 that is coupled to the display 508 via an optical waveguide 510.

Figure 5B:
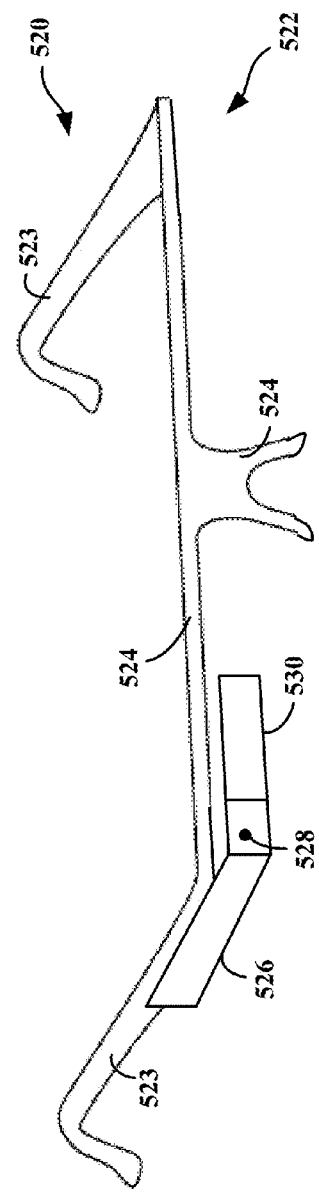
FIG. 5B illustrates an example system for receiving, transmitting, and displaying data.

FIG. 5B illustrates an example system 520 for receiving, transmitting, and displaying data. The system 520 is shown in the form of a wearable computing device 522. The wearable computing device 522 may include side-arms 523, a center frame support 524, and a bridge portion with nosepiece 525. In the example shown in FIG. 5B, the center frame support 524 connects the side-arms 523. The wearable computing device 522 does not include lens-frames containing lens elements. The wearable computing device 522 may additionally include an on-board computing system 526 and a video camera 528, such as those described with respect to FIGS. 4A and 4B.

The wearable computing device 522 may include a single lens element 530 that may be coupled to one of the side-arms 523 or the center frame support 524. The lens element 530 may include a display such as the display described with reference to FIGS. 4A and 4B, and may be configured to overlay computer-generated graphics upon the user's view of the physical world. In one example, the single lens element 530 may be coupled to a side of the extending side-arm 523. The single lens element 530 may be positioned in front of or proximate to a user's eye when the wearable computing device 522 is worn by a user. For example, the single lens element 530 may be positioned below the center frame support 524, as shown in FIG. 5B.

Figure 6:
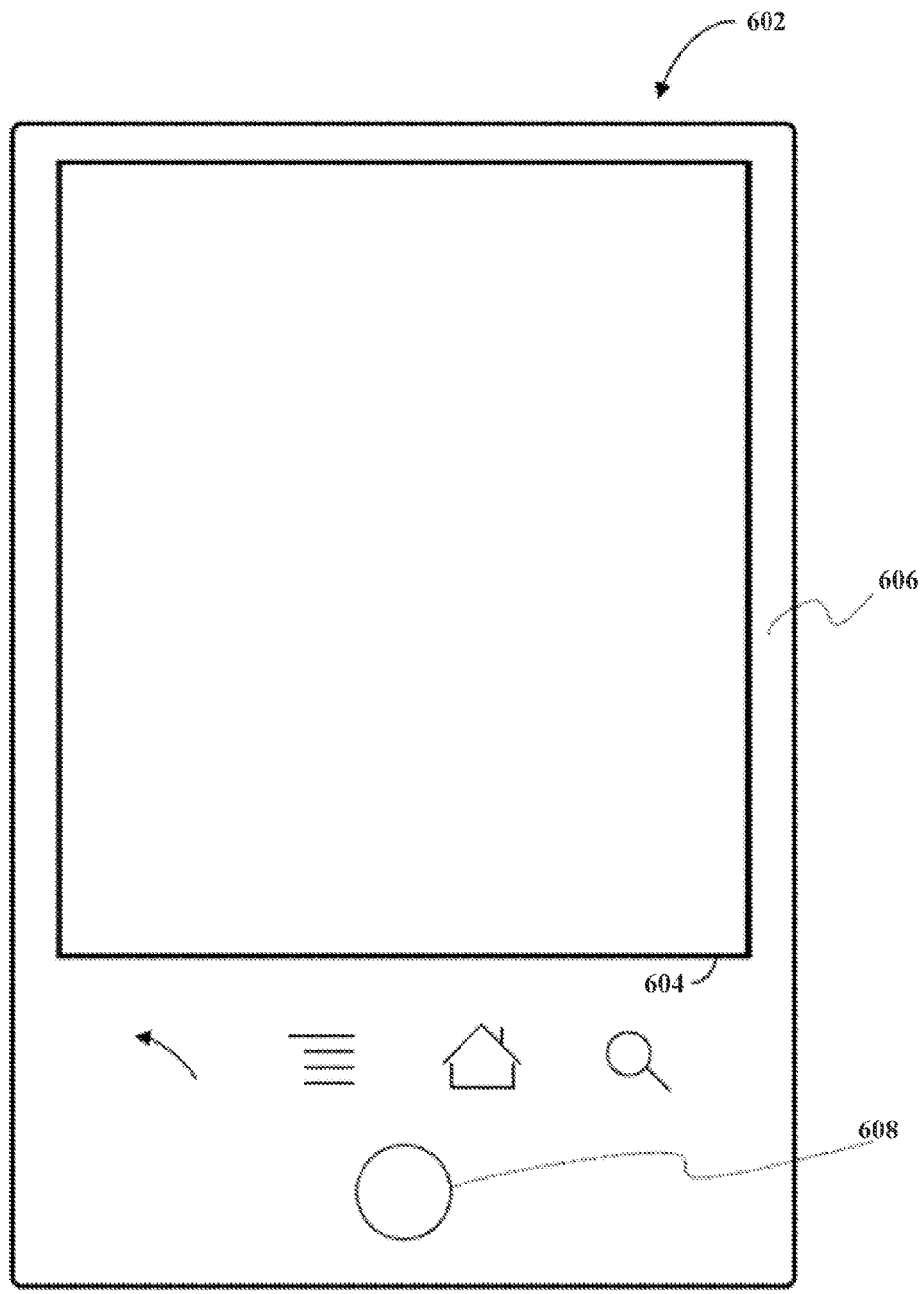
FIG. 6 shows an example system for dynamically controlling a virtual input area.

FIG. 6 shows an example system for dynamically controlling a virtual input area. More particularly, FIG. 6 shows an example portable computing system 602 that includes a user-interface 604. It should be understood, however, that example computing system 602 is shown for purposes of example and explanation only, and should not be taken to be limiting.

Example computing system 602 is shown in the form of a cell phone that includes user-interface 604. While FIG. 6 depicts cell phone 602 as an example of a portable computing system, other types of portable computing systems could additionally or alternatively be used (e.g. a tablet device, among other examples). As illustrated in FIG. 6, cell phone 602 includes a rigid frame 606, a plurality of input buttons 608, and user-interface 604. User-interface 604 may be a touchscreen, having a touchpad configured to receive touch inputs embedded into a graphical display, and may be arranged to depict various input areas. Alternatively, user-interface 604 may be a trackpad, having a touchpad configured to receive touch inputs, but no graphical display.

As noted, the example computing system 602 may include plurality of input buttons 608 as well as user-interface 604, although this is not necessary. In another embodiment, for example, computing system 602 may include only user-interface 604 and not plurality of buttons 608. Other embodiments of computing system 602 may be possible as well. FIG. 7 shows a simplified block diagram depicting example components of an example computing system 700. Computing system 700 may include at least one processor 702 and system memory 704. In an example embodiment, computing system 700 may include a system bus 706 that communicatively connects processor 702 and system memory 704, as well as other components of computing system 700. Depending on the desired configuration, processor 702 can be any type of processor including, but not limited to, a microprocessor (g), a microcontroller (X), a digital signal processor (DSP), or any combination thereof. Furthermore, system memory 704 can be of any type of memory now known or later developed including but not limited to volatile memory (such as RAM), non-volatile memory (such as ROM, flash memory, etc.) or any combination thereof.

An example computing system 700 may include various other components as well. For example, computing system 700 includes an A/V processing unit 708 for controlling graphical display 710 and speaker 712 (via A/V port 714), one or more communication interfaces 716 for connecting to other computing devices 718, and a power supply 720. Graphical display 710 may be arranged to provide a visual depiction of various input regions provided by user-interface 200, such as the depiction provided by graphical display 201. Note, also, that user-interface 200 may be compatible with one or more additional user-interface devices 728 as well.

Furthermore, computing system 700 may also include one or more data storage devices 724, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media Computing system 700, communicates using a communication link 716 (e.g., a wired or wireless connection) to a remote device 718. The remote device 718 may be any type of computing device or transmitter including a laptop computer, a mobile telephone, or tablet computing device, etc., that is configured to transmit data to computing system 700. The remote device 718 and the computing system 700 may contain hardware to enable the communication link 716, such as processors, transmitters, receivers, antennas, etc.

Figure 7:
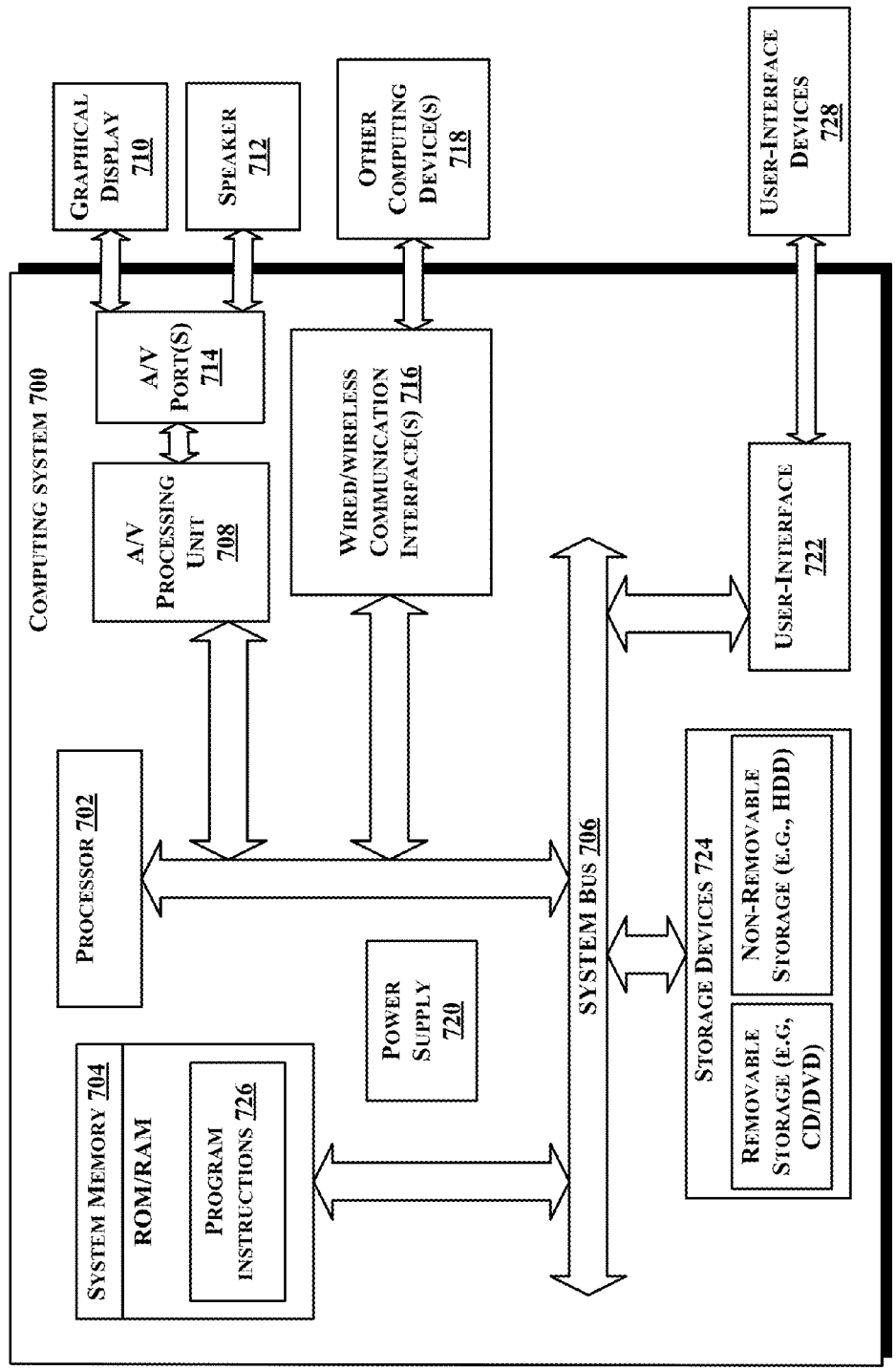
FIG. 7 shows a simplified block diagram depicting example components of an example computing system.

In FIG. 7, the communication link 716 is illustrated as a wireless connection; however, wired connections may also be used. For example, the communication link 716 may be a wired serial bus such as a universal serial bus or a parallel bus, among other connections. The communication link 716 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 730 may be accessible via the Internet and may include a computing cluster associated with a particular web service (e.g., social-networking, photo sharing, address book, etc.).

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

4. EXAMPLE CAMERA-BASED EMBODIMENT

While the example methods described herein have thus far been described as being carried out using particular computing systems, this is for purposes of example and explanation only. It should be understood that other computing systems, including computing systems that provide user-interfaces comprising a set of input regions other than those described above may be utilized as well.

An example of one such other computing system may include a motion-sensing input device that is configured to provide a virtual keyboard. In particular the motion-sensing input device may include a camera and the camera may be arranged to detect input movements that correspond to a user's gestures. Such gestures may be made "in the air," in front of the camera such that the camera is capable of observing the gestures. In an embodiment, the input movement may comprise depth-based input movements.

For purposes of example and explanation, the user may move a first hand through the air to select various virtual input areas of the virtual keyboard. Further, in an embodiment, the user may initially move a hand "forward" to indicate that the user would like to begin an input gesture. And, in an embodiment, the user may move the hand "backward" to indicate the user is done with the input gesture.

And further, the user's other hand (that is, the hand that is not providing the input gesture) may be used for additional and/or alternative input functions. For instance, a user may use the other hand to select and/or disambiguate between "possibly intended" inputs. Additionally, the other hand may be used to select punctuation. Other examples of uses for the other hand may exist as well.

5. EXAMPLE FUMBLE METHOD

In an embodiment, a "fumble method" may be carried out prior to, or concurrent with, the execution of the blocks described with respect to FIG. 1. Such a fumble method may enable the system to identify, and ultimately disregard, touch inputs that the user may not intend to be interpreted by the computing system as a part of an intended character-string input. For example, a user may "fumble" (or jitter) when initially coming into contact with a touch surface (i.e., the user may incidentally contact the surface prior to an intended input). As another example, the user may stray from an intended input during input of an intended character-string. In some cases it would be desirable if such a "fumble" (or jitter) were disregarded by the computing system.

Figure 8:
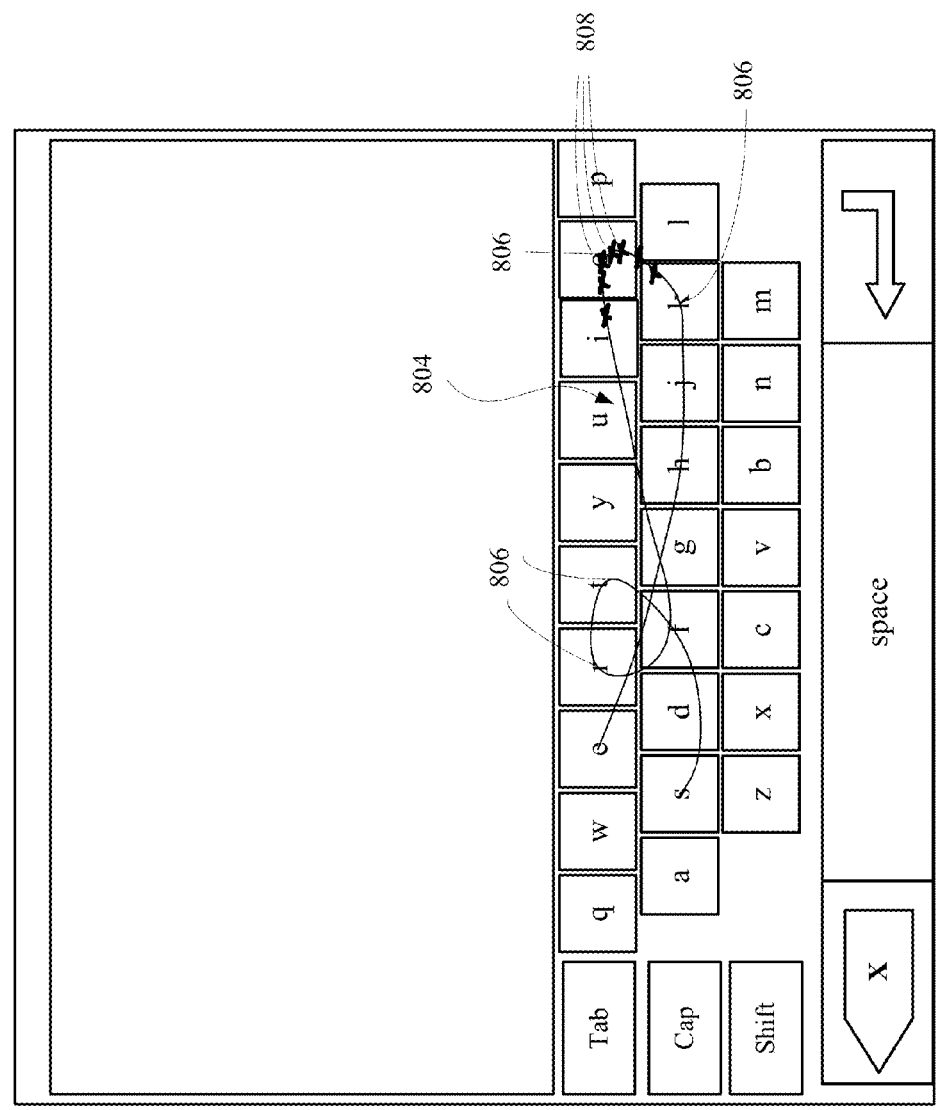
FIG. 8 shows an example input movement and aspects of an example user-interface.
Figure 9:
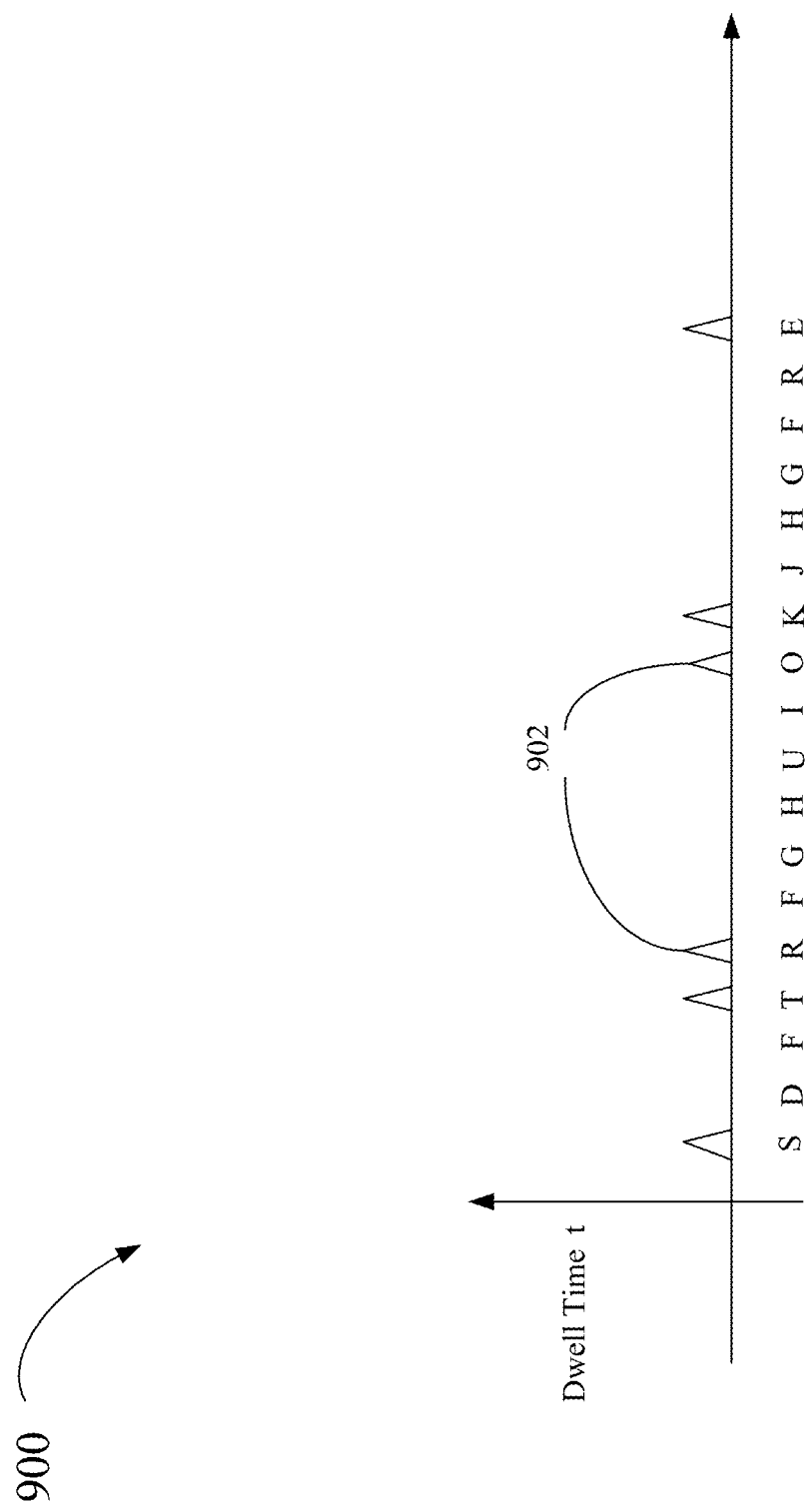
FIG. 9 is a chart illustrating detection of dwell points.

Recognizing that a typical input gesture stroke may not be a perfect polyline made of straight lines connected by vertices, the computing system may be configured to simplify the input stroke by removing extraneous data, such as jitter, so as to facilitate easier comparison with the predefined strokes. In a particular embodiment, the computing system may be configured to simplify the input stroke by identifying dwell points 806, shown in FIG. 8, in the input stroke, such as the individual letters of the word "STROKE" 804, and generating a polyline that has those dwell points as its vertices. As shown in FIG. 9, dwell points may be detected when the user dwells on a letter for some detectible extent of time. Due to the nature of how the user targets individually the letters of a word, the user may pause slightly, thereby generating dwell times 902 associated with the detected dwell points.

The computing system may then compare that resulting simplified stroke with predefined strokes to find a closest match. For instance, the computing system may take the N generated equidistant points along the simplified stroke, and compare those points pairwise with the N points representing each predefined stroke. For the pairwise point comparison, the computing system may be configured to evaluate an average sum of the squares of the distances between the paired points of the simplified and predefined strokes, and to select the predefined stroke for which the least difference exists. Further, a language model could be used to resolve ambiguity in this selection process.

During operation, when the user drags his/her finger on a keyboard at a substantially constant rate, the computing system may be configured to analyze the gesture stroke to determine dwelling times 902, thereby identifying corresponding dwell points, as shown in FIG. 9.

Figure 10:
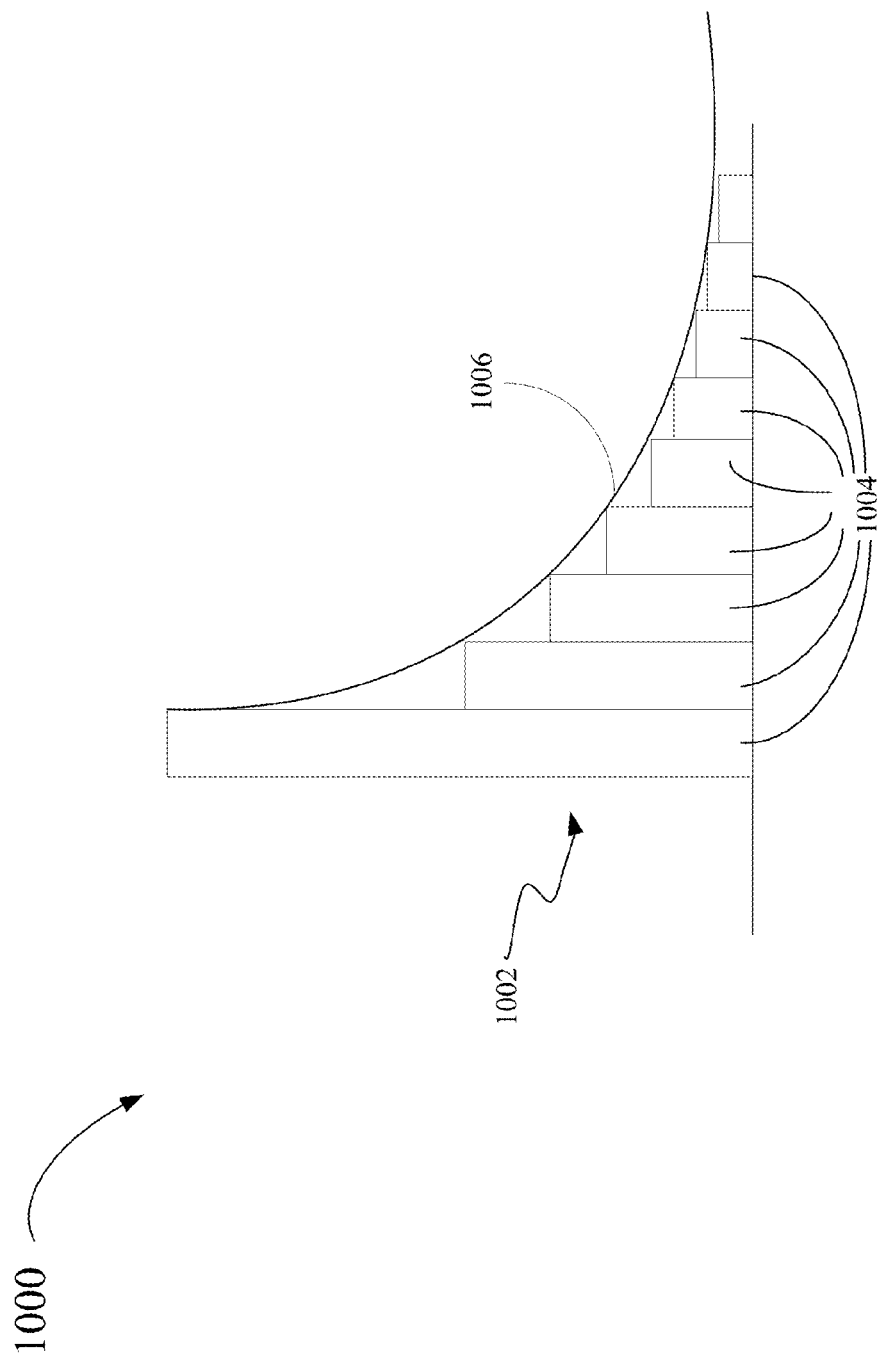
FIG. 10 is a histogram based on these inter-coordinate distances.

The computing system may further evaluate distances separating sequential pairs of sensor input points, which are separated in time by the constant rate provisioning. That is, inter-coordinate distances for consecutive pairs of coordinates are evaluated. The computing system may then be configured to generate a histogram based on these inter-coordinate distances. Because closer or more proximate sequential pairs of input points 808 are located near dwell points 806, as shown in FIG. 8, the generated histogram may have an "L" shape. As shown in FIG. 10, by connecting successive columns 1004 of the generated histogram 1002, a curve 1004, having an elbow 1006, is generated. Points with coordinates near those of the letters of interest are to the left of elbow 1010.

Near elbow 1006, to identify the letters of interest, the computing system determines a dwell point threshold distance, such that points that are located at a distance less than or equal to the threshold distance, are determined to be potentially associated with letters of the intended word, and the remaining points are discarded. Consecutive sets of points associated with potential letters of the intended word are grouped together in a sequence of points. When the endpoints of the sequence are not identical, the computing system reduces the sequence to the endpoints. When the endpoints are identical, the computing system reduces the sequence to a single endpoint. The computing system further combines the endpoints together to reduce the user's input stroke to a set of straight line segments, which may be referred to as a simplified stroke. The computing system is configured to re-sample the simplified stroke to identify N equidistant points, as discussed above, in order to perform a comparison between the simplified stroke and the set of predefined stroke templates.

In one embodiment, for the comparison between the simplified stroke and the set of predefined stroke templates, the computing system is configured to avoid comparing against all stroke templates, as that could be prohibitively costly in time and unnecessary in most cases. Because the user lifts his/her finger when close to the last letter of the intended word, the computing system may filter out the predefined stroke templates for words that do not end near the coordinates as that of the evaluated simplified stroke. For each remaining stroke template, as stated above, N equidistant points are compared one to one to those of the simplified stroke. The computing system may then use the above-discussed average sum of the square of the distances between each pair of points, with one pair point associated with simplified stroke and the other pair point associated with the remaining stroke template, as an error metric for matching each remaining template to the simplified stroke. The remaining set of stroke templates is then ordered using the error metric in ascending order. In case the error metric for one of the remaining stroke templates is less than the predetermined certainty or accuracy threshold, then the computing system enters the corresponding word without requiring the user to manually select the best matching stroke template. On the other hand, if no error metric is less than or equal to the certainty threshold, then the computing system may present the user with a list of top words, corresponding to lowest error metrics. The user may then select the intended word, if on the list.

In one embodiment, the computing system is configured to measure a total length of the simplified stroke, and to filter out predefined stroke templates that have a total length that is greater than a predetermined length difference threshold.

In another embodiment, the computing system is configured to recognize that the user may land on the keyboard at a location other than that of the first letter of the intended word. In this event, the computing system may determine a line segment from the landing location to the first subsequent determined dwell point, and may add that line segment to the beginning of each predefined stroke template with which the simplified stroke is to be compared. As such, when the landing location is not the intended location, the computing system may still perform the matching of the simplified stroke with a predefined stroke template. When the landing location is substantially near the intended location, the computing system may disregard the substantially negligible line segment, as its impact on the stroke comparison is minimal.

In yet another embodiment, recognizing that the user may input a continuous stroke representing a continuous sequence of words separated only by a spacebar or the like, the computing system may disregard the line segments from and to the spacebar, i.e., from the last dwell point and to a first subsequent dwell point.

In one embodiment, the computing system may be configured to generate a visible response to the user's finger or stylus interaction with the touch-based interface. For example, when the user's finger or stylus lands, the computing system may animate a collapsing circle around the landing location, like a reverse sonar wave. This circle animation can help the user figure out where he/she has contacted the touch-based interface.

In a further variation, as the user moves his/her finger or stylus on the touch-based interface, an empty circle can be represented. When the user dwells on a particular letter, the circle may start to fill in from its center or may fill in like a growing slice of a pie or a sweeping clock hand. Alternately, instead of filling, the circle may fade when the user dwells on a particular letter.

6. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   providing a user-interface comprising a set of input regions, wherein each of the input regions is associated with at least one character from a set of characters;
   receiving data indicating an input movement;
   determining, using a plurality of Hidden Markov Models (HMMs), for each of one or more possibly-intended inputs, a respective likelihood that each respective possibly-intended input corresponds to the input movement, wherein the input movement comprises observable states of a Hidden Markov Model of the plurality of Hidden Markov Models,
   wherein each of the one or more possibly-intended inputs is associated with (i) at least two possible input states, wherein each of the at least two possible input states is associated with at least one input region, wherein each of the possible input states is a hidden state of the Hidden Markov Model and (ii) a possible transition state between the at least two possible input states, wherein each of the possible transition states is a hidden state of the Hidden Markov Model, and
   wherein each respective likelihood is determined based at least in part on (i) a likelihood that at least two intended input states correspond to the at least two possible input states associated with the respective possibly-intended input, and (ii) a likelihood that an intended transition state between the at least two intended input states corresponds to the possible transition state between the at least two possible input states;
   selecting, based on at least one determined respective likelihood, at least one possibly-intended input; and
   causing a visual display of the selected at least one possibly-intended input.

2. The method of claim 1, wherein the user-interface comprises a contact-sensitive input element and wherein the contact-sensitive input element detects the input movement.

3. The method of claim 2, wherein the contact-sensitive input element comprises a graphical display.

4. The method of claim 1, wherein the input movement is a continuous input movement.

5. The method of claim 1, wherein the input movement includes one or more unintended breaks in contact and wherein the breaks in contact treated as continuous sections of the input movement.

6. The method of claim 1, wherein at least one of the at least two possible input states is associated with more than one input region.

7. The method of claim 1, wherein the possibly-intended inputs are a subset of a predefined set of possibly-intended inputs.

8. The method of claim 7, wherein the predefined list of possibly-intended inputs comprises possibly-intended inputs that are predefined based on user-preferences.

9. The method of claim 1, wherein the respective likelihood that each respective possibly-intended input corresponds to the input movement is determined while the data indicating an input movement is being received.

10. The method of claim 9, wherein the selected at least one possibly-intended input is selected and displayed on the visual display while the data indicating an input movement is still being received.

11. The method of claim 10, wherein the displayed at least one possibly-intended input comprises a set of possibly-intended inputs, the set of possibly-intended inputs comprising at least two possibly-intended inputs, the method further comprising:
    receiving data indicating a selection of one possibly-intended input from the set of the possibly-intended inputs; and
    causing a visual display of the one possibly-intended input indicated by the received data indicating the selection of the one possibly-intended input from the set of the possibly-intended inputs.

12. The method of claim 1, wherein each respective likelihood is determined based on (i) the likelihood that the at least two intended input states correspond to the at least two possible input states associated with the respective possibly-intended input, and (ii) the likelihood that the transition state between that at least two intended input states corresponds to the possible state transition between the at least two possible input states.

13. The method of claim 1, wherein the likelihood that the intended transition state between that at least two intended input states corresponds to the possible transition state between the at least two possible input states is determined based on at least a consideration of contextual effects.

14. The method of claim 1, wherein the data indicating an input movement further comprises data indicating at least one instantaneous rate of movement of the input movement, and wherein determining each respective likelihood is further based on the data indicating the at least one instantaneous rate of movement.

15. The method of claim 14, wherein the data indicating an input movement further comprises data indicating at least one instantaneous acceleration of the input movement, and wherein determining each respective likelihood is further based on the data indicating the at least one instantaneous acceleration.

16. The method of claim 1, wherein the input movement further corresponds to one or more unintended states, wherein each respective likelihood is further determined based on the likelihood that the at least two possible input states corresponds to one of the one or more unintended states.

17. The method of claim 1, further comprising:
causing a visual display of a set of possibly-intended inputs, the set of possibly-intended inputs comprising at least two possibly-intended inputs.

18. The method of claim 17, wherein the visual display of the set of possibly-intended inputs comprises a ranked-order visual display of a ranked list of the set of possibly-intended inputs, wherein each possibly-intended input from the set of possibly-intended inputs is ranked based on at least the determined respective likelihood of each possibly-intended input from the set of possibly-intended inputs.

19. The method of claim 17, further comprising:
receiving data indicating a selection of one possibly-intended input from the set of the possibly-intended inputs; and
causing a visual display of the one possibly-intended input indicated by the received data indicating the selection of the one possibly-intended input from the set of the possibly-intended inputs.

20. The method of claim 1, wherein the user-interface comprises a camera, wherein the camera detects the input movement, and wherein the input movement comprises depth-based input movements.

21. A non-transitory computer-readable medium having instructions stored thereon comprising:
providing a user-interface comprising a set of input regions, wherein each of the input regions is associated with at least one character from a set of characters;
receiving data indicating an input movement;
determining, using a plurality of Hidden Markov Models (HMMs), for each of one or more possibly-intended inputs, a respective likelihood that each respective possibly-intended input corresponds to the input movement, wherein the input movement comprises observable states of a Hidden Markov Model of the plurality of Hidden Markov Models,
wherein each of the one or more possibly-intended inputs is associated with (i) at least two possible input states, wherein each of the at least two possible input states is associated with at least one input region, wherein each of the possible input states is a hidden state of the Hidden Markov Model and (ii) a possible transition state between the at least two possible input states, wherein each of the possible transition states is a hidden state of the Hidden Markov Model, and
wherein each respective likelihood is determined based at least in part on (i) a likelihood that at least two intended input states correspond to the at least two possible input states associated with the respective possibly-intended input, and (ii) a likelihood that an intended transition state between the at least two intended input states corresponds to the possible transition state between the at least two possible input states;
selecting, based on at least one determined respective likelihood, at least one possibly-intended input; and
causing a visual display of the selected at least one possibly-intended input.

22. The non-transitory computer-readable medium of claim 21, wherein the user-interface comprises a contact-sensitive input element and wherein the contact-sensitive input element detects the input movement.

23. The non-transitory computer-readable medium of claim 21, wherein the input movement is a continuous input movement.

24. The non-transitory computer-readable medium of claim 21, wherein the input movement includes one or more unintended breaks in contact and wherein the breaks in contact treated as continuous sections of the input movement.

25. The non-transitory computer-readable medium of claim 21, wherein at least one of the at least two possible input states is associated with more than one input region.

26. The non-transitory computer-readable medium of claim 21, wherein the possibly-intended inputs are a subset of a predefined set of possibly-intended inputs.

27. The non-transitory computer-readable medium of claim 21, wherein the respective likelihood that each respective possibly-intended input corresponds to the input movement is determined while the data indicating an input movement is being received.

28. The non-transitory computer-readable medium of claim 21, wherein each respective likelihood is determined based on (i) the likelihood that the at least two intended input states correspond to the at least two possible input states associated with the respective possibly-intended input, and (ii) the likelihood that the intended transition state between that at least two intended input states corresponds to the possible transition state between the at least two possible input states.

29. The non-transitory computer-readable medium of claim 21, wherein the likelihood that the intended transition state between that at least two intended input states corresponds to the possible state transition between the at least two possible input states is determined based on at least a consideration of contextual effects.

30. The non-transitory computer-readable medium of claim 21, wherein the data indicating an input movement further comprises data indicating at least one instantaneous rate of movement of the input movement,
wherein determining each respective likelihood is further based on the data indicating the at least one instantaneous rate of movement.

31. The non-transitory computer-readable medium of claim 21, wherein the input movement further corresponds to one or more unintended states, wherein each respective likelihood is further determined based on the likelihood that the at least two possible input states corresponds to one of the one or more unintended states.

32. The non-transitory computer-readable medium of claim 21, the instructions further comprising:
   causing a visual display of a set of possibly-intended inputs, the set of possibly-intended inputs comprising at least two possibly-intended inputs.

33. The non-transitory computer-readable medium of claim 21, wherein the user-interface comprises a camera, wherein the camera detects the input movement, and wherein the input movement comprises depth-based input movements.

34. A system comprising:
   a processor;
   a non-transitory computer readable medium; and
   program instructions stored on the non-transitory computer readable medium and executable by the processor to cause a computing device to:
      provide a user-interface comprising a set of input regions, wherein each of the input regions is associated with at least one character from a set of characters;
      receive data indicating an input movement;
      determine, using a plurality of Hidden Markov Models (HMMs), for each of one or more possibly-intended inputs, a respective likelihood that each respective possibly-intended input corresponds to the input movement, wherein the input movement comprises observable states of a Hidden Markov Model of the plurality of Hidden Markov Models,
         wherein each of the one or more possibly-intended inputs is associated with (i) at least two possible input states, wherein each of the at least two possible input states is associated with at least one input region, wherein each of the possible input states is a hidden state of the Hidden Markov Model and (ii) a possible state transition between the at least two possible input states, wherein each of the possible transition states is a hidden state of the Hidden Markov Model, and
         wherein each respective likelihood is determined based at least in part on (i) a likelihood that at least two intended input states correspond to the at least two possible input states associated with the respective possibly-intended input, and (ii) a likelihood that an intended transition state between the at least two intended input states corresponds to the possible transition state between the at least two possible input states;
      select, based on at least one determined respective likelihood, at least one possibly-intended input; and
      cause a visual display of the selected at least one possibly-intended input.

35. The system of claim 34, wherein the user-interface comprises a contact-sensitive input element and wherein the contact-sensitive input element detects the input movement.

36. The system of claim 34, wherein the input movement is a continuous input movement.

37. The system of claim 34, wherein the input movement includes one or more unintended breaks in contact and wherein the breaks in contact treated as continuous sections of the input movement.

38. The system of claim 34, wherein at least one of the at least two possible input states is associated with more than one input region.

39. The system of claim 34, wherein the possibly-intended inputs are a subset of a predefined set of possibly-intended inputs.

40. The system of claim 34, wherein the respective likelihood that each respective possibly-intended input corresponds to the input movement is determined while the data indicating an input movement is being received.

41. The system of claim 34, wherein each respective likelihood is determined based on (i) the likelihood that the at least two intended input states correspond to the at least two possible input states associated with the respective possibly-intended input, and (ii) the likelihood that the intended transition state between that at least two intended input states corresponds to the possible transition state between the at least two possible input states.

42. The system of claim 34, wherein the likelihood that the intended transition state between that at least two intended input states corresponds to the possible transition state between the at least two possible input states is determined based on at least a consideration of contextual effects.

43. The system of claim 34, wherein the data indicating an input movement further comprises data indicating at least one instantaneous rate of movement of the input movement,
   wherein determining each respective likelihood is further based on the data indicating the at least one instantaneous rate of movement.

44. The system of claim 34, wherein the input movement further corresponds to one or more unintended states, wherein each respective likelihood is further determined based on the likelihood that the at least two possible input states corresponds to one of the one or more unintended states.

45. The system of claim 34, further comprising program instructions stored on the non-transitory computer readable medium and executable by the processor to cause a computing device to:
   cause a visual display of a set of possibly-intended inputs, the set of possibly-intended inputs comprising at least two possibly-intended inputs.

46. The system of claim 34, wherein the user-interface comprises a camera, wherein the camera detects the input movement, and wherein the input movement comprises depth-based input movements.

* * * * *